US012792885B2

(12) United States Patent
Dong et al.

(10) Patent No.: US 12,792,885 B2
(45) Date of Patent: Nov. 10, 2026

(54) MULTI-TASK NEURAL NETWORK DESIGN USING TASK CRYSTALIZATION

(71) Applicant: GE Precision Healthcare LLC, Wauwatosa, WI (US)

(72) Inventors: Xiaomeng Dong, San Ramon, CA (US); Michael Potter, Concord, CA (US); Hongxu Yang, Utrecht (NL); Ravi Soni, Livermore, CA (US); Gopal Biligeri Avinash, Concord, CA (US)

(73) Assignee: GE Precision Healthcare LLC, Waukesha, WI (US)

(*) Notice: Subject to any disclaimer, the term of this patent is extended or adjusted under 35 U.S.C. 154(b) by 866 days.

(21) Appl. No.: 18/300,807

(22) Filed: Apr. 14, 2023

(65) Prior Publication Data

US 2024/0346291 A1 Oct. 17, 2024

(51) Int. Cl.

| | |
|---|---|
| ***G06N 3/0455*** | (2023.01) |
| ***G06N 3/045*** | (2023.01) |
| ***G06N 3/063*** | (2023.01) |
| ***G06N 3/082*** | (2023.01) |
| ***G06N 3/084*** | (2023.01) |

(52) U.S. Cl.

CPC ........... *G06N 3/0455* (2023.01); *G06N 3/082* (2013.01)

(58) Field of Classification Search

CPC ...... G06N 3/0455; G06N 3/082; G06N 3/045; G06N 3/063; G06N 3/084

See application file for complete search history.

(56) References Cited

U.S. PATENT DOCUMENTS

2023/0290134 A1* 9/2023 Hu ........................... G06N 3/08
2025/0307653 A1* 10/2025 Vaghani ............... G06N 3/0985

FOREIGN PATENT DOCUMENTS

WO WO-2019157257 A1 * 8/2019 ............. G06N 3/045

OTHER PUBLICATIONS

Chen Y, Yu J, Zhao Y, Chen J, Du X. Task's Choice: Pruning-Based Feature Sharing (PBFS) for Multi-Task Learning. Entropy. 2022; 24(3):432. https://doi.org/10.3390/e24030432 (Year: 2022).*

Lee et al., Adaptive Contrastive Learning with Dynamic Correlation for Multi-Phase Organ Segmentation, Oct. 16, 2022, https://arxiv.org/pdf/2210.08652 (Year: 2022).*

(Continued)

*Primary Examiner* — Kakali Chaki
*Assistant Examiner* — Molly C Sippel
(74) *Attorney, Agent, or Firm* — Amin, Turocy & Watson, LLP

(57) ABSTRACT

Techniques are described for multi-task neural network model design using task crystallization are described. In one example a task crystallization method comprises adding one or more task-specific channels to a backbone neural network adapted to perform a primary inferencing task to generate a multi-task neural network model, wherein the adding comprises adding task-specific elements to different layers of the backbone neural network for each channel of the one or more task-specific channels. The method further comprises training, by the system, the one or more task-specific channels to perform one or more additional inferencing tasks that are respectively different from one another and the primary inferencing task, comprising separately tuning and crystallizing the task-specific elements of each channel of the one or more task-specific channels.

19 Claims, 18 Drawing Sheets

(56) References Cited

OTHER PUBLICATIONS

Mullapudi, R. T. et al. | "HydraNets: Specialized Dynamic Architectures for Efficient Inference," 2018 IEEE/CVF Conference on Computer Vision and Pattern Recognition, Salt Lake City, UT, USA, 2018, pp. 8080-8089, doi: 10.1109/CVPR.2018.00843, 10 pages.

Youtube Video | "Tesla AI Day 2021." Youtube video https://www.youtube.com/watch?v=j0z4FweCy4M, Streamed live on Aug. 19, 2021, last accessed Feb. 6, 2023, transcript provided, 112 pages.

Krizhevsky, A. et al. | "ImageNet Classification with Deep Convolutional Neural Networks." In Advances in Neural Information Processing Systems 25: 26th Annual Conference on Neural Information Processing Systems 2012. Proceedings of a meeting held Dec. 3-6, 2012, Lake Tahoe, Nevada, United States (pp. 1106-1114), 9 pages.

Zoph, B. et al. | "Neural Architecture Search with Reinforcement Learning." In 5th International Conference on Learning Representations, ICLR 2017, Toulon, France, Apr. 24-26, 2017, Conference Track Proceedings. OpenReview.net, 16 pages.

* cited by examiner

1300

Experimental Results – Task Performance (Accuracy/Dice score)

| Task | Individual training | Joint training | Previous Method | Task Crystallization |
|---|---|---|---|---|
| ACPC | 82.3 | 80.8 | 83 | 83.3 |
| ON | 78.1 | 74.5 | 77.5 | 78.5 |
| HIP | 81.5 | 79.4 | 81.2 | 82.1 |
| IAC | 77 | 76.2 | 77.3 | 78.2 |
| PIT | 80 | 79.7 | 80.5 | 80.7 |
| MSPA | 84.2 | 81.3 | 83.3 | 84.2 |
| MSPC | 86.1 | 83.3 | 85.3 | 86.2 |

FIG. 13

1400

Experimental Results – Inferencing Speed

| Inferencing time in ms (Task-cumulative) | | | |
|---|---|---|---|
| Task | Individual | Previous | TC |
| ACPC | 6.02 | 7.01 | 6.05 |
| ON | 12.04 | 12.33 | 11.01 |
| HIP | 18.05 | 17.39 | 14.88 |
| IAC | 24.07 | 22.80 | 19.19 |
| PIT | 30.09 | 26.42 | 23.80 |
| MSPA | 36.11 | 31.63 | 27.53 |
| MSPC | 42.12 | 36.68 | 31.02 |

FIG. 14

1500

Experimental Results – Total Parameters

| Total Parameters (Task-cumulative) | | | |
|---|---|---|---|
| Task | Individual | Previous | TC |
| ACPC | 353601 | 293923 | 197917 |
| ON | 707202 | 531393 | 346543 |
| HIP | 1060803 | 684532 | 549232 |
| IAC | 1414404 | 831997 | 789969 |
| PIT | 1768005 | 922778 | 831198 |
| MSPA | 2121606 | 1160163 | 1033887 |
| MSPC | 2475207 | 1397548 | 1236576 |

FIG. 15

MULTI-TASK NEURAL NETWORK DESIGN USING TASK CRYSTALIZATION

TECHNICAL FIELD

This application relates to multi-task neural networks and more particular to techniques for generating multi-task neural networks with optimized performance, latency and resource consumption.

BACKGROUND

The success of artificial intelligence (AI) applications deployed on medical devices heavily depends on the inferencing speed of AI models and the number of AI applications a device can host. Conventionally, one deep learning model is built for a single application only. This development of various related product models in a regulated environment leads to a linear increase in model counts and development time. Enabling N AI applications on a device requires N models, each consuming a large memory footprint and requiring separate inferencing time. As a result, it heavily affects the scalability of AI applications and leads to slow multi-application inferencing time and high resource consumption.

Alternatively, one can use a single, multi-task deep network to perform multiple tasks by jointly training all tasks. However, this method suffers from several critical drawbacks, including poor results, training difficulties and maintenance issues. In this regard, jointly training a multi-task model increases the difficulty of the problem and therefore often leads to worse results than having individually trained models. In addition, when multiple tasks share the same set of weights, they inevitably interfere with each other, making the training process much more difficult and potentially even preventing some of the tasks from converging at all. Furthermore, when multiple tasks are jointly trained with shared weights, the weights and features which are important for the different tasks become entangled. This makes it impossible to make targeted improvements to the performance of one task without impacting the other tasks. Any future model upgrades would therefore require re-validation of all the other existing tasks, thereby incurring significant development, maintenance and regulatory costs.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described that facilitate multi-task neural network development and application integration using task crystallization.

According to an embodiment, a system is provided that comprises a memory that stores computer-executable components, and a processor that executes the computer-executable components stored in the memory. The computer-executable components comprise a task defining component that adds one or more task-specific channels to a backbone neural network adapted to perform a primary inferencing task to generate a multi-task neural network model, wherein each channel of the one or more task-specific channels comprises task-specific elements respectively associated with different layers of the backbone neural network. The computer-executable components further comprise a training component that trains the one or more task-specific channels to perform one or more additional inferencing tasks that are respectively different from one another and the primary inferencing task, wherein the training component separately tunes and crystallizes the task-specific elements of each channel of the one or more task-specific channels as constrained by an optimization function that controls optimal values of the respective parameters based on a defined performance criterion for the one or more additional inferencing tasks and one or more additional resource optimization objectives for the multi-task neural network model. In various implementations, the one or more additional resource optimization objectives comprise minimizing an overall memory footprint of the multi-task neural network model and/or minimizing an overall latency of the multi-task neural network model.

As a result of the training, the multi-task neural network model is adapted to perform a set of different inferencing tasks consisting of the primary inferencing task and the one or more additional inferencing tasks. In some embodiments, the computer-executable components further comprise a selection component that selects a subset of the different inferencing tasks, and a partitioning component that partitions multi-task neural network model into a sub-model adapted to perform the subset of the different inferencing tasks. The computer-executable components can further comprise an inferencing component that applies the sub-model to corresponding input data for the subset of the different inferencing tasks and generates corresponding inference outputs.

In some embodiments, elements described in connection with the disclosed systems can be embodied in different forms such as a computer-implemented method, a computer program product, or another form.

DESCRIPTION OF THE DRAWINGS

FIGS. 13-15 present tables providing the results of an experiment testing task crystallization in comparison to alternative methods as applied to generate AI models adapted to perform multiple organ segmentation tasks.

DETAILED DESCRIPTION

Figure 1:
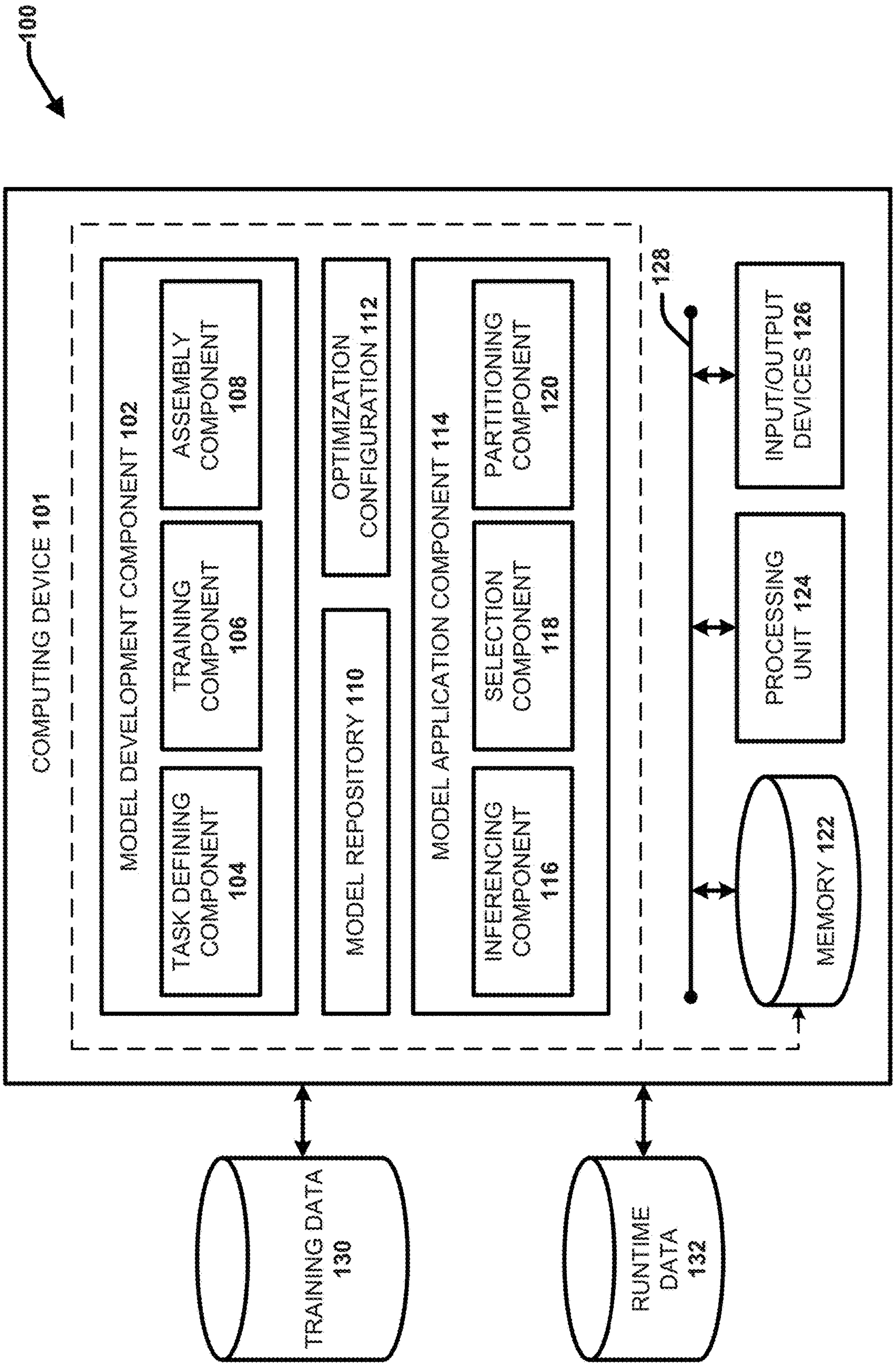
FIG. 1 illustrates an example, non-limiting system that facilitates multi-task neural network development and application integration using task crystallization in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate generating multi-task neural networks with optimized performance, latency and resource consumption. To facilitate this end, the disclosed techniques provide a novel process for generating multi-task neural network models referred to herein as "Task Crystallization." Task crystallization solves multi-task learning on a micro-layer perspective by redefining the traditional convolution operation so that each task is handled by different filters within some or all layers of the model.

The task crystallization process involves obtaining or creating a backbone neural network adapted to perform a primary inferencing task. One or more additional task-specific channels are then added to the backbone neural network to generate a multi-task neural network model, wherein each channel of the one or more task-specific channels comprises one or more task-specific elements (e.g., task-specific nodes or filters and associated task-specific filter weights) associated with different layers of the backbone neural network. The task crystallization architecture restricts information flow between the backbone elements and the task-specific elements such that the task-specific elements receive one-way information flow from the backbone elements in a preceding layer. In addition, none of the task-specific elements of one task-specific channel are connected to any of the task-specific elements of other channels of the task specific channels.

The task-specific channels are further independently trained to perform one or more additional inferencing tasks that are respectively different from one another and the primary inferencing task. In particular, the training comprises separately tuning (e.g., adding/removing task-specific nodes or filters and adjusting filter weights) and crystallizing respective elements of the one or more task-specific channels as constrained by an optimization function that controls optimal values of the respective task-specific based on a defined performance criterion (e.g., a minimum performance quality score, such as a minimum Dice score or another measure representative of inference output accuracy, quality and/or specificity), for the one or more additional inferencing tasks and one or more additional resource optimization objectives for the multi-task neural network model. In various embodiments, the one or more additional resource optimization objectives comprise minimizing an overall memory footprint of the multi-task neural network model. Additionally, or alternatively, the one or more additional resource optimization objectives comprise minimizing an overall latency or inferencing speed of the multi-task neural network model.

In this regard, the term "task crystallization" refers to the process of appending one or more task-specific elements to each layer of the backbone neural network for a particular task-specific channel and subsequently setting or freezing (i.e., "crystallizing") the one or more task-specific elements at their optimal values (e.g., accounting for the optimal number nodes/filters added to each channel, optimal node/filter weights, etc.) determined as a function of tuning during training until convergence is reached and the defined performance criterion and the additional resource objectives are satisfied.

In various embodiments, the one or more task-specific elements added to respective layers of the backbone neural network model for each task channel include or correspond to layer filters or nodes, however other types of neural network elements are envisioned. In this regard, the backbone neural network model can comprise a plurality of convolutional layers, each layer comprising one or more backbone nodes or filters, wherein respective nodes or filters in one layer feed information to respective nodes or filters in the layer immediately following that layer. The number of backbone filters included in each layer of the backbone network can vary.

The concept of task crystallization is rooted in the fact that the process defines and adds one or more tasks-specific elements (e.g., task-specific filters or the like) to each layer of a previously trained backbone neural network model, creating a dedicated subset (e.g., each subset including one or more elements) of tasks specific elements within each layer of the backbone neural network model. Each of the backbone neural network model layers have been previously trained with defined backbone filters and backbone filter weights. During training of the multi-task neural network model, the training component does not adjust or change any of the backbone neural network model layer filters or weights. The training component on the contrary merely tunes only the subset of task-specific elements added to each layer of the backbone neural network for each task. In addition, because each of the task-specific channels are independent of one another, the training component can tune only the subset of task-specific elements associated with one task-specific channel without affecting the task-specific elements of other task-specific channels and without affecting the backbone neural network elements.

Additionally, each task-specific channel reuses the previously defined and existing backbone neural network parameters (e.g., the set backbone filters and filter weights). In particular, each task-specific filter added to each layer of the backbone neural network (e.g., excluding the first layer) is connected to the one or more task-specific filters in the previous layer for the same task, as well as to all backbone filters of the previous layer. As a result, the task-specific filters can learn to make efficient usage of a common backbone network and adapt it for a particular task at every layer of the network during training.

Further, each task-specific channel is independent from one another within the multi-task neural network model. In this regard, task-specific filters (or other types of layer elements) of one task specific-channel do not connect to any of the task-specific filters of another task specific-channel. In addition, the task-specific filters of each layer receive one-way information flow from the backbone filters of the previous layer, thus the task specific-specific filters do not serve as inputs to the common backbone neural network filters. This property allows each task-specific channel to be separately trained and maintained.

Furthermore, due to the independence of the task-specific channels throughout the multi-task neural network model, one neural network graph model can be cleanly partitioned into sub-graphs or sub-models comprising one or more of the different task-specific channels such that a partial inferencing of any subset of tasks can be achieved to further save inferencing time without incurring redundant operations or requiring conditional flow on graphs.

The subject innovation provides the following advantages:

Faster inferencing speed: Bundling tasks leads to better multi-task inferencing speed. This in turn enhances customer experience and real-world applicability. In time-sensitive applications (like clinical emergency diagnosis or surgery), faster inferencing can potentially improve patient outcomes.

Smaller resource consumption/footprint: The techniques described herein can reduce the resources needed to run multiple AI applications, thereby lowering the hardware requirements to run such applications and thus potentially decreasing the component cost of our medical devices. On existing medical devices, it can enable resource-heavy AI applications that wouldn't be possible otherwise.

Better results: While conventional multi-task models struggle to match the performance of individually trained AI models, the techniques herein can deliver a multi-task model with equivalent or better results than individually trained models. Better results can increase the success of the deployed AI applications.

Easy to train: The techniques herein can enable task independence, which allows each task to train or tune its parameters separately without affecting other tasks at a micro level, eliminating the risk of divergence due to task interference and reducing the complexity and time/resources needed to develop a successful model. The ability to tune parameters independently can also ensure each application to be designed and run at its optimal setting in multi-task models.

Easy to maintain: Because of its task independence, even after deployment, each task can still be individually improved/upgraded without affecting other tasks. This opens the possibility of continuously improving a specific existing application in a multi-task product. This can also save significant amounts of regulatory efforts when upgrading an existing application because the rest of the applications won't be affected and therefore won't require new filings of regulatory documentation where applicable (e.g., in the clinical context and other domains).

Easy to expand: The techniques herein can add new applications or remove existing applications on already deployed multi-task models, without affecting existing applications and/or requiring them to be re-certified.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates multi-task neural network development and application integration using task crystallization in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a computing device 101 that includes several computer-executable components including model development component 102 which includes task defining component 104, training component 106 and assembly component 108, and model application component 114 which includes inferencing component 116, selection component 118 and partitioning component 120. These computer/machine executable components can be stored in memory associated with the one or more machines. The memory can further be operatively coupled to at least one processing unit such that the components can be executed by the at least one processing unit to perform the operations described. For example, in some embodiments, these computer/machine executable components can be stored in memory 122 of the computing device 101 which can be coupled to processing unit 124 for execution thereof. Examples of said and memory and processing unit 124 as well as other suitable computer or computing-based elements, can be found with reference to FIG. 18, and can be used in connection with implementing one or more of the systems or components shown and described in connection with FIG. 1 or other figures disclosed herein.

Memory 118 can further store a variety of information that is received by, used by, and/or generated by the computing device 101 in association developing multi-task neural network models by the model development component 102 using training data 130 and applying the multi-task neural network models post-training to new input data (e.g., included in runtime data 132) by the model application component 114. In the embodiment shown, this information includes (but is not limited to), model repository 110 and optimization configuration 112. The model repository 110 can include one or more fully trained and developed multi-task neural network models generated by the model development component 102 in accordance with the disclosed task crystallization techniques. The model repository 110 can also include pre-trained versions of the multi-task neural network models and/or pre-trained components thereof that are used by the model development component 102 to generate the fully trained versions of the multi-task neural network models. For example, the pre-trained versions of the multi-task neural network models can include one or more previously defined deep neural network (DNNs) models whose convolutional layer filters, filter weights, and/or interlayer filter connections have not yet been tuned for a particular inferencing task. The optimization configuration 112 can include information defining and/or controlling the optimization criteria utilized by the training component 106 to control model training and tuning the parameters of the multi-task neural network models to perform multiple inferencing tasks.

The computing device 101 can further include one or more input/output devices 126 to facilitate receiving user input in association with generating and/or applying the multi-task neural network models and rendering information to users in association with generating and/or applying the multi-task neural network models. In this regard, Any information received (e.g., training data 130 and/or subsets thereof, runtime data 132 and/or subsets thereof) and/or generated by (e.g., multi-task neural network models, components thereof and/or inference outputs generated by the models) by the computing device 101 can be presented or rendered to a user via a output device, such as a display, a speaker or the like, depending on the data format. Suitable examples of the input/output devices 126 are described with reference to FIG. 18 (e.g., input devices 1828 and output device 1836). The computing device 101 can further include a device bus 128 that couples the memory, the processing unit 124 and the input/output device 126 to one another.

The model development component 102 facilitates training and developing one or more multi-task neural network models using the disclosed task crystallization techniques. To facilitate this end, the model development component 102 includes task defining component 104, training component 106 and assembly component 108. The different inferencing tasks that multi-task neural network models are trained to perform can vary. In this regard, the disclosed techniques can be employed to generate multi-task neural network models that perform different types of inferencing tasks in various domains, such as image processing tasks, classification tasks, natural language processing (NLP) tasks and various others. For example, in some embodiments, the different inferencing tasks can include segmentation of different anatomical regions of interest (ROIs) included in input medical images. However, it should be appreciated that the disclosed techniques can be applied to essentially any type of inferencing task in association with processing various forms of input data types and signals.

Figure 2:
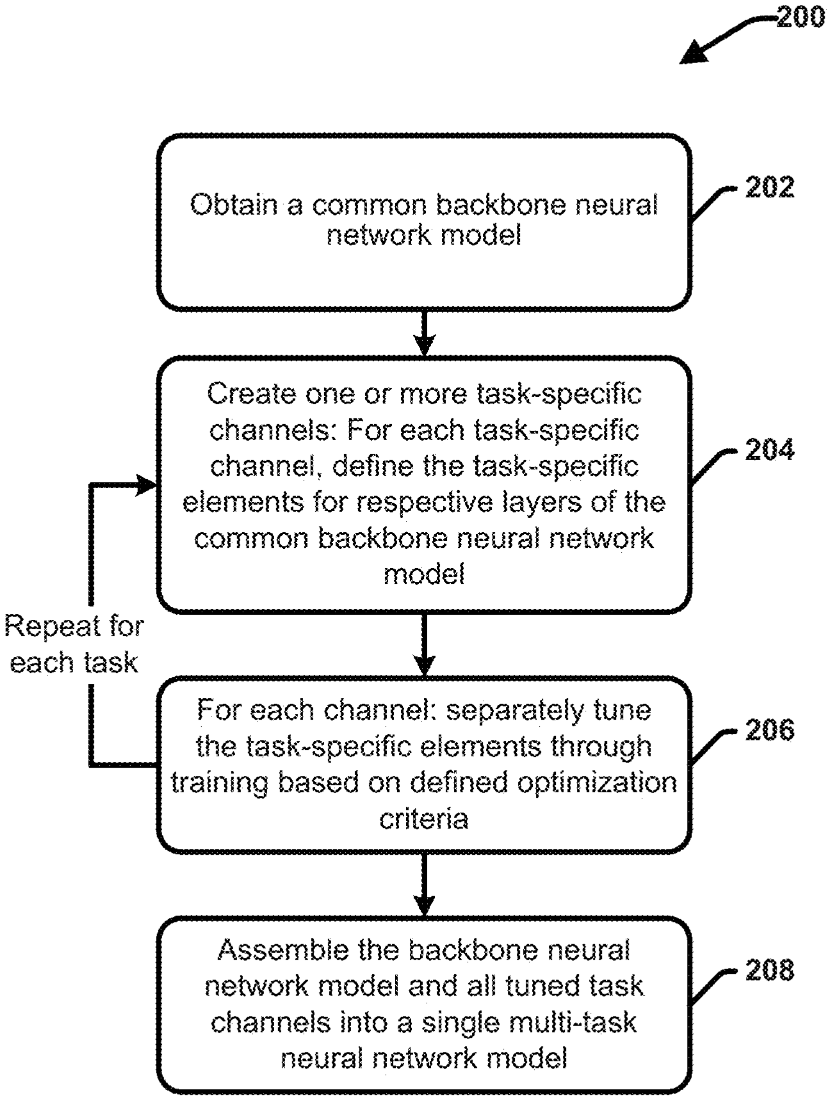
FIG. 2 presents a flow diagram of an example high-level process for generating a multi-task neural network model using task crystallization in accordance with one or more embodiments of the disclosed subject matter.

FIG. 2 presents a flow diagram of an example high-level process 200 for generating a multi-task neural network model using task crystallization in accordance with one or more embodiments of the disclosed subject matter. With reference to FIGS. 1 and 2, in accordance with process 200, at 202 the task crystallization method involves initially obtaining a backbone neural network adapted to perform a primary inferencing task by the model development component 102. In some embodiments, the common backbone neural network model can be previously generated and included in the model repository 110. Reference to a previously generated backbone neural network model means that the backbone model has been previously defined and trained to perform a primary inferencing task such the parameters or elements of the backbone neural network model have been tunned and set. These parameters or elements typically include the backbone layer filters and backbone filter weights, although other types of neural network model parameters are envisioned. In other embodiments, at 202 the training component 106 can train and generate the common backbone neural network model, as exemplified in FIG. 6 and process 600.

The common backbone neural network model can include any type of neural network model that employs an interconnected node/neuron and layer architecture. In this regard, a neural network is a simplified model of the way the human brain processes information. It works by simulating a large number of interconnected processing units, referred to as nodes or neurons (other terms are envisioned) that resemble abstract versions of neurons. The nodes can correspond to filters, functions and/or other types of neural network elements (e.g., synapses, biases, etc.) depending on the type of the neural network and the task the neural network is trained to perform. The nodes or filters are arranged in layers. There are typically three parts in a neural network: an input layer, with nodes representing the input fields; one or more hidden layers; and an output layer, with a unit or units representing the target field(s). The units are connected with varying connection strengths (or weights). Input data are presented to the first layer, and values are propagated from each node to every node in the next layer until a result is delivered from the output layer. The number of layers and nodes included in each layer of the common backbone network neural model can vary.

In various exemplary embodiments, the common backbone neural network model is or corresponds to a deep neural network (DNN). A deep neural network refers to a neural network model with multiple layers between the input and output layers. DNNs must consider many training parameters, such as the size (number of layers and number of nodes or units per layer), the learning rate, and initial weights. DNN thus require significantly more resources (e.g., processing/computational resources and memory resources) and time to train and execute as the number of training parameters and the size increases. Various types neural networks and DNNs exist and are being developed in the future and the common backbone neural network may correspond to one or more of these types of neural networks, including but not limited to: a feed-forward neural network, a convolutional neural network (CNN), a recurrent neural network, a transformer or portions thereof, a generative adversarial network (GAN), or an autoencoder network or portions thereof.

Autoencoders are deep learning functions which approximate a mapping from an input to an output utilizing an encoder network corresponding to a first DNN and a decoder network corresponding to a second DNN. The encoder network first compresses the input features into a lower-dimensional representation and then the decoder network reconstructs the output from this representation. The encoder network of an autoencoder essentially corresponds to a feature extractor network that extracts a feature set from the input data and reduces the dimensionality of the feature set into a lower-dimensional representation. In some embodiments, the backbone neural network model is or corresponds to an encoder network of a previously trained autoencoder. Additionally, or alternatively, the backbone neural network model is or corresponds to a decoder network of a previously trained autoencoder. Still in other embodiments, the backbone neural network model can include both the encoder network and the decoder network of a previously trained autoencoder model.

At 204, the task defining component 104 creates one or more task-specific channels of the multi-task neural network model. Each task specific channel corresponds to a channel within the multi-task neural network model adapted to perform a specific inferencing task, wherein each inferencing task of each channel is different. For instance, in one example embodiment, each inferencing task may correspond to segmentation of a different anatomical ROI included in input medical images. In general, the different inferencing tasks of each task-specific channel are related to the primary inferencing task that the backbone neural network model was trained to perform such that the output signals generated by respective layers of the backbone neural network model serve as relevant input signals to the task-specific nodes of the task-specific channels. In this regard, at 204, for each-task specific channel, the task defining component 104 defines the task-specific elements for respective layers of the common backbone neural network model. The task-specific elements (also refereed to as task-specific parameters) can vary depending on the type of the neural network employed by the common backbone neural network model and the particular inferencing tasks that the multi-neural network model is being trained to perform. In general, the task-specific elements include the number of task-specific nodes or units included in each channel of the common backbone neural network model, the logic executed by each of each of the task-specific nodes or units (e.g., acting as filters, functions or other types of neural network elements), and the task-specific weights connecting to each of the task-specific nodes or units.

Figure 3:
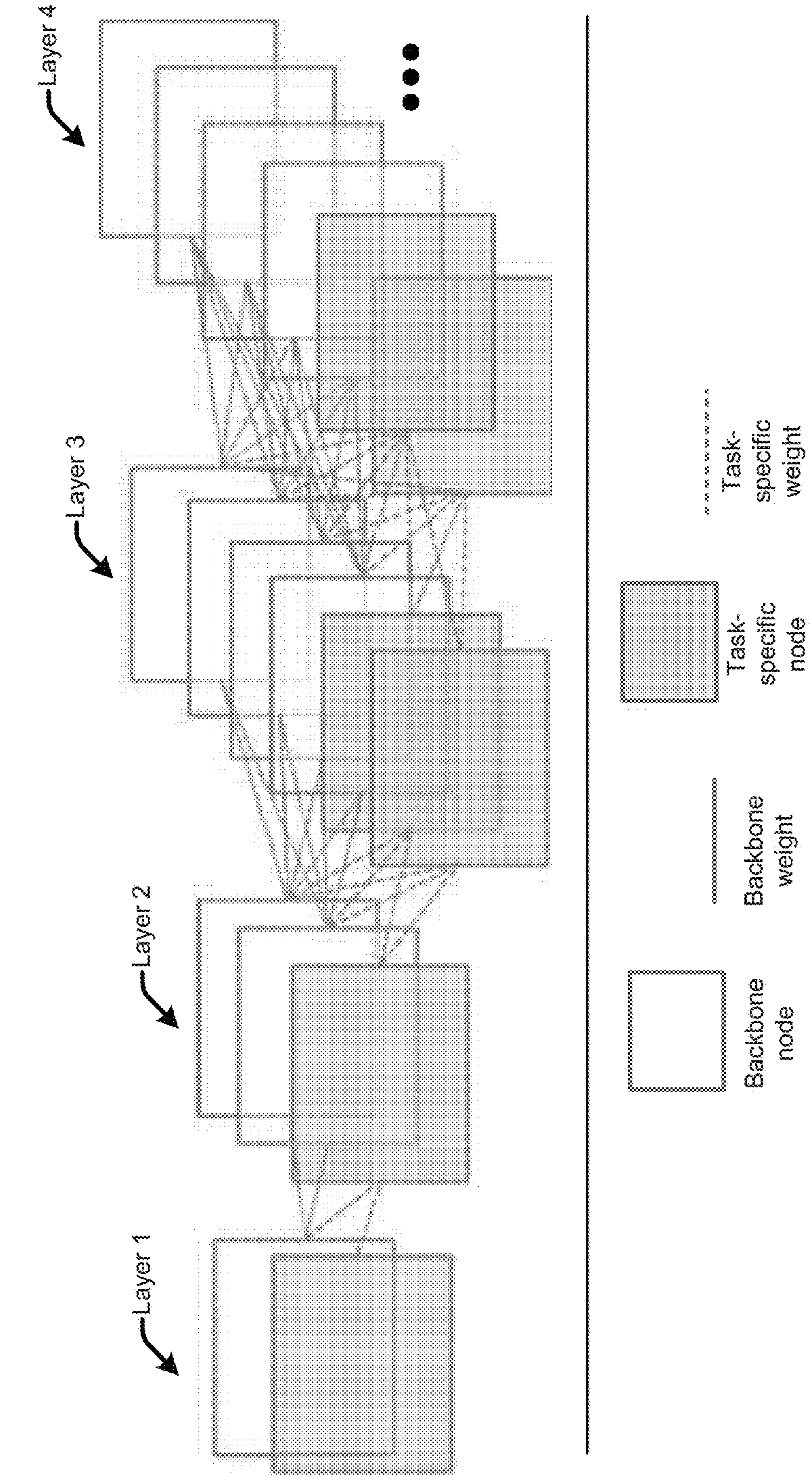
FIG. 3 illustrates adding a task-specific channel to a backbone deep neural network model in accordance with one or more embodiments of the disclosed task crystallization techniques.

For example, FIG. 3 illustrates adding a task-specific channel to a backbone deep neural network model in accordance with one or more embodiments of the disclosed task crystallization techniques. The backbone neural network model nodes are represented by white boxes and the task-specific nodes are represented by grey boxes. The backbone neural network model comprises a plurality of different nodes respectively associated with different layers (e.g., layer 1, layer 2, layer 3, and layer 4 as illustrated). It should be appreciated that four layers are presented for sake of illustration and that the number of layers included in the backbone neural network model can vary. The number of nodes included in each layer of the backbone neural network model can also vary yet will be predefined prior to initializing task crystallization in association with adding additional task-specific channels to the backbone neural network model. Each (or in some embodiments one or more) backbone node included in respective layers of the backbone neural network mode is connected to and feeds output data generated by that node to each (or in some embodiments one or more) of the backbone nodes in the layer immediately following, it as indicated by the solid connection lines between the respective backbone nodes, which also correspond to the backbone weights. In this regard, each sold backbone connection line corresponds to a backbone node weight.

With reference to FIGS. 1-3, in accordance with the disclosed task crystallization techniques and process 200, at 204, in association with adding a task-specific channel to the backbone neural network model, the task defining component 104 defines and adds one or more task-specific nodes (i.e., wherein the one or more task-specific nodes correspond to task-specific elements), represented in FIG. 3 by the gray boxes, to each (or in some embodiments one or more) layer of the backbone neural network model. In some embodiments, the task-specific nodes correspond to task-specific filters, however various other types of neural network nodes are envisioned. In various embodiments, the number of task specific nodes added to each layer of the backbone neural network model for a given task-specific channel can be controlled as a function of the number of backbone nodes included in the corresponding layers and/or the total number of backbone nodes included in the backbone neural network model. For example, in some implementations, the task defining component 104 can be configured to restrict the number of added task-specific nodes to each layer of the backbone neural network model such that the number added to each layer is proportional to the number of backbone nodes in that layer controlled by a parameter $\alpha$, with a minimum of 1 task-specific node per layer to preserve information flow. In the example illustrated in FIG. 3, $\alpha$=0.5. In this regard, the process of task crystallization solves the problem of multi-task learning on a micro-layer perspective: redefining the traditional convolution operation so that each individual task is handled by one or more different task-specific nodes within every layer of the backbone neural network model.

In association with adding the one or more task-specific nodes to each layer of the backbone neural network model, the task defining component 104 also defines the connections between the backbone nodes and the task-specific nodes and the initial task-specific node weights associated with the respective connections (wherein the connections and the weights attributed to the connections are also considered task-specific elements unless otherwise stated herein), represented in FIG. 3 by the dashed lines. As illustrated in FIG. 3, the task defining component 104 connects each task-specific node in one layer to each task-specific node in the following, downstream layer (e.g., wherein layer 2 is downstream from layer 1, layer 3 is downstream from layer 2, layer 4 is downstream from layer 3 and so one). The task defining component 104 also connects each backbone node in one layer to each task-specific node in the following downstream layer. The task defining component 104 however does not connect any of the task-specific nodes to any of the backbone nodes in a following downstream layer, such that the task-specific nodes to not feed any information into any of the backbone nodes. In this manner, the task defining component 104 restricts information flow between the backbone nodes and the task-specific nodes such that the task-specific nodes receive one-way information flow from the backbone node or nodes in the preceding layer. In this regard, every task-specific node is connected to the previous layer's task-specific nodes for the same task specific channel as well as to all backbone nodes of the previous layer. As a result, the task-specific filters can learn to make efficient usage of the backbone neural network model node outputs and adapt them for a particular task at every layer of the network.

In the embodiment shown in FIG. 3, a single task-specific channel has been added to the backbone neural network model. In accordance with process 200, at 204 of process 200, the task defining component 104 can add a plurality of task-specific channels to the backbone neural network model in the same manner as illustrated in FIG. 3. The number of task-specific channels that can be added to the multi-task neural network model is essentially unlimited. In addition, each time the task defining component 104 adds an additional task-specific channel to the backbone neural network model, the task defining component 104 ensures the respective task-specific channels remain independent from one another by not connecting task-specific nodes of one task-specific channel to any of the task-specific nodes to any of the other task-specific channels.

Continuing with process 200, at 206, for each channel, the training component 106 separately tunes the task-specific elements through model training based on defined optimization criteria provided in the optimization configuration 112. This process at 206 corresponds to parameter tuning and/or hyperparameter tuning of conventional machine learning training processes. The task-specific elements that are tuned can include but are not limited to, the number of task-specific nodes added to each layer of the backbone neural network model, the operations performed by the respective task-specific nodes, and the task-specific node weights. Of particular importance, in association with training each task-specific channel, the training component 106 does not adjust or change any of the parameters or elements (e.g., nodes and/or node weights) of the backbone neural network model. Said differently, the training component 106 maintains the original parameters of the common backbone neural network model while adjusting only the task-specific parameters or elements associated with the tasks-specific channels. The optimization criteria can include one or more minimum performance metrics for the task-specific channel that account for a level of accuracy, quality and/or specificity of the channel's inferencing capability. For example, in various implementations, the optimization criteria can include a minimum Dice score for the task-specific channel.

The disclosed task crystallization techniques however are further concerned with not only generating a multi-task neural network model with different task specific channels that perform with an acceptable level of accuracy (e.g., a minimum level of accuracy which can vary depending on the application), but also creating a multi-task model that is also resource efficient in terms of inferencing speed and overall memory footprint. In this regard, as the number of task-specific nodes added to each layer of the backbone neural increases, the inferencing latency or speed of the task-specific channel as well as the memory resource footprint is also increased. Thus, in one or more embodiments, the optimization criteria utilized by the training component 106 can further include satisfying an optimization function that balances these objectives while also meeting a minimum performance criterion for the task-specific channel. For example, the optimization function can control task-specific element or parameter tuning during training such that the training component 106 tunes the task-specific elements or parameters to find the optimal configuration of the task-specific parameters that minimizes the inferencing speed and the memory resource consumption of the task-specific channel while also meeting a defined performance accuracy level (e.g., a minimum Dice score or another performance valuation metric).

In various embodiments, the process of setting the optimal task-specific elements or parameters of each task-specific channel upon completion of training is referred to herein as crystallization of the task-specific elements. In this regard, once the optimal task-specific elements (e.g., number of task-specific nodes or filters and filter weights) have been determined based on the optimization criteria, the training component 106 can set or crystalize the task-specific elements at the optimal values, converting the task-specific elements for that channel into "crystalized elements." In this regard, the term "task crystallization" refers to the process of appending one or more task-specific elements to each layer of the backbone neural network for a particular task-specific channel and subsequently setting or freezing (i.e., "crystallizing") the one or more task-specific elements at their optimal values (e.g., accounting for the optimal number nodes/filters added to each channel, optimal node/filter weights, etc.) determined as a function of tuning during training until convergence is reached and the defined performance criterion and the additional resource objectives are satisfied.

The training process can follow conventional machine learning model training regimens including supervised machine learning, unsupervised machine learning and/or combinations thereof, depending on the particular type of inferencing task that the respective task-specific channels are being trained to perform. In this regard, in association with training a task-specific channel added to the backbone neural network model, the training component 106 trains the task-specific channel to generate a desired inference output based on a task-specific training dataset (e.g., included in the training data 130) that the task-specific channel is adapted to processes. The training component 106 further independently trains and tunes the elements of each task-specific channel until the optimization criteria have been satisfied and convergence has been reached. The training of each task-specific channel may be performed in sequence or in parallel. In this regard, steps 204 and 206 of process 200 can be repeated any number or times to add any number of desired task specific-channels to the common backbone neural network model.

Figure 4:
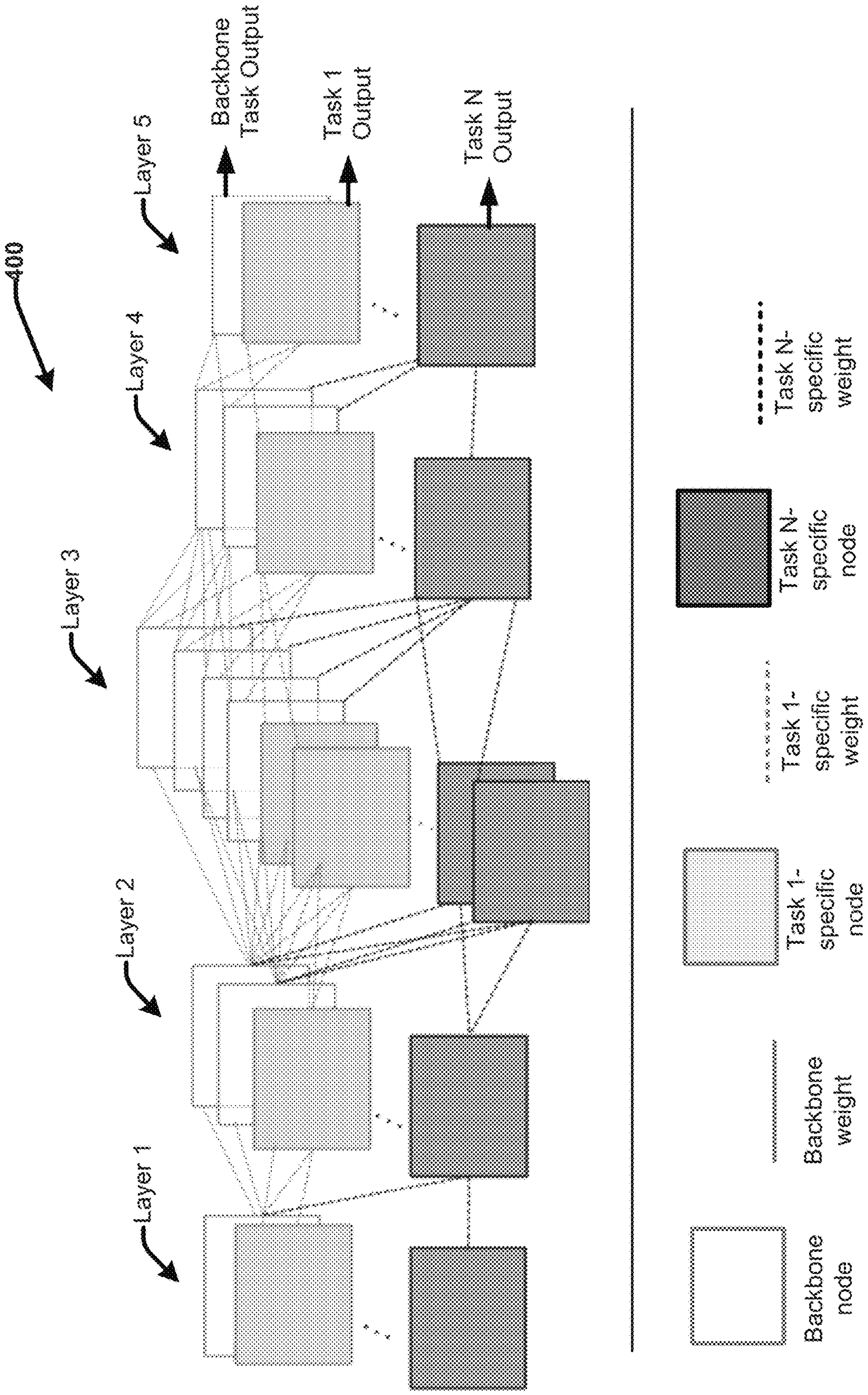
FIG. 4 illustrates an example multi-task neural network model with a task crystallization architecture generated in accordance with the disclosed task crystallization techniques in accordance with one or more embodiments.

Continuing with process 200, once all task-specific channels have been added to the common backbone neural network model and tuned to determine and set the optimal task-specific elements for each task-specific channel (i.e., once all the task specific elements have been "crystalized"), at 208, the assembly component 108 can assemble the backbone neural model and all tuned task channels 1-N into a single, multi-task neural network model, as illustrated in FIG. 4.

In this regard, FIG. 4 illustrates an example multi-task neural network model 400 with a task crystallization architecture generated in accordance with the disclosed task crystallization techniques in accordance with one or more embodiments. The multi-task neural network model 400 has a single graph structure comprising a plurality of task-specific channels, including a backbone task channel corresponding to the original or primary inferencing task of the backbone neural network model. The channels added via task crystallization include channels 1-N, wherein the number of added channels N can vary. Each of the respective channels are adapted to generate a different task-specific inference output. As illustrated in FIG. 4, the assembly component 108 combines all crystalized, task-specific nodes into the same graph at each layer of the original backbone neural network model, resulting in a single multi-task neural network graph, with different task-specific channels and nodes representing different tasks.

The multi-task neural network model 400 has the following properties:

Parameter sharing: Every task-specific crystalized node is connected to the previous layer's crystalized node or nodes that perform the same task, as well as to all backbone nodes of the previous layer. As a result, the crystalized filters can learn to make efficient usage of the backbone node outputs adapt them for a particular task at every layer of the network.

Task independence: Crystalized task-specific nodes of one task do not connect to crystalized, task-specific nodes of other tasks nor serve as inputs to the shared backbone. As a result, the task specific nodes of each task-specific channel are independent of one another such that the result of one task-specific channel will not affect another's. This property allows each task-specific channel to be separately trained and maintained and updated without affecting other ones of the task specific channels.

Partial Inferencing: Due to the independence of the task-specific channels throughout the network, the single graph structure of the multi-task neural network model 400 can be cleanly partitioned (from beginning to end) into sub-graphs or sub-models comprising one or more task-specific channels such that a partial inferencing of any subset of tasks can be achieved to further save inferencing time without incurring redundant operations or requiring conditional flow on graphs.

With reference to FIGS. 1-4, the model development component 102 can further store the trained multi-task neural network models (e.g., model 400 or the like) generated by the model development component 102 in model repository 110 for usage in runtime applications by the model application component 114. In this regard, the model application component 114 can include inferencing component 116 to apply one or more of the task-specific channels of a multi-task neural network model generated using task crystallization to corresponding input data for the respective channels (e.g., included in runtime data 132) to generate the corresponding inference outputs. In some embodiments, the inferencing component 116 may execute the entirety of a multi-task neural network model (e.g., model 400 or the like) to generate all of the different tasks specific inference outputs that the model is capable of generating (e.g., the backbone task output and the respective task outputs 1-N). Additionally, or alternatively, the selection component 118 and the partitioning component 120 can facilitate partial inferencing in association with selectively executing a subset of the inferencing tasks (e.g., wherein the subset may include one or more task, two or more tasks, three of more tasks, and so on).

For example, in some embodiments, as a result of the training process (e.g., described with reference to process 200), the multi-task neural network model 400 can be adapted to perform a set of different inferencing tasks consisting of a primary inferencing task (e.g., corresponding to the backbone inferencing task) and one or more additional inferencing tasks 1-N. The selection component 118 can further select (e.g., automatically based on a received processing request from another application or system or in response to another defined event) or facilitate selecting (e.g., receiving manual input) a subset of the different inferencing tasks to be executed. The partitioning component 120 can further partition the multi-task neural network model into a sub-model adapted to perform the subset of the different inferencing tasks, and the inferencing component 116 can apply the sub-model to corresponding input data for the subset of the different inferencing tasks to generate the corresponding inference outputs. For example, in some embodiments, the partitioning component 120 can selectively turn on or off one or more of the task-specific channels to facilitate partial inferencing. In other embodiments, the partitioning component 120 can generate an edited version (i.e., an edited copy) of the multi-task neural network model comprising a subset of the task-specific channels (e.g., wherein the subset may comprise one or more task-specific channels, two or more task-specific channels, and so on). The model application component 114 can further store the edited version of the multi-task neural network model in the model repository 110, execute/run the edited version to generate the corresponding inference outputs, and/or send (e.g., transmit via a network or the like) the edited version to another device, or system for utilization thereof.

Figure 5:
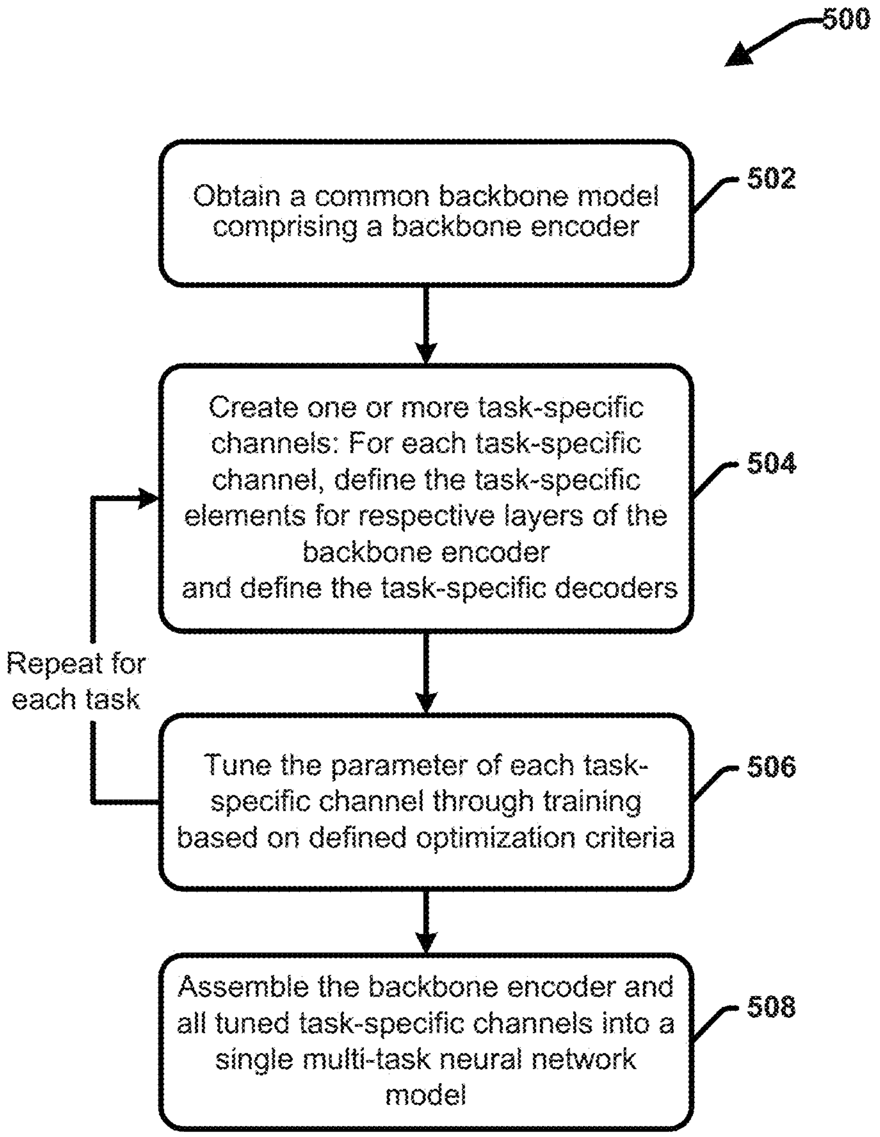
FIG. 5 presents a flow diagram of another example high-level process for generating a multi-task neural network model using task crystallization in accordance with one or more embodiments of the disclosed subject matter.

FIG. 5 presents a flow diagram of another example high-level process 500 for generating a multi-task neural network model using task crystallization in accordance with one or more embodiments of the disclosed subject matter. Process 500 is similar to process 200 yet tailored to one or more embodiments in which the multi-task neural network model employs a shared encoder backbone network in accordance with the autoencoder DNN architecture. Repetitive description of like elements employed in respective embodiments is omitted for sake of brevity.

With reference to FIGS. 1-5, in accordance with process 500, at 502 the task crystallization method involves initially obtaining a backbone neural network adapted to perform a primary inferencing task by the model development component 102, wherein the backbone neural network model comprises a backbone encoder. With these embodiments, the shared encoder network is utilized as a common feature extractor for the multi-task neural network model. The shared encoder is further combined with task-specific decoders, one for each task specific channel, in the multi-task neural network model. In some embodiments, the common backbone encoder can be previously generated and included in the model repository 110. In other embodiments, at 502 the training component 106 can train and generate the common backbone encoder, as exemplified in FIG. 6 and process 600.

Figure 6:
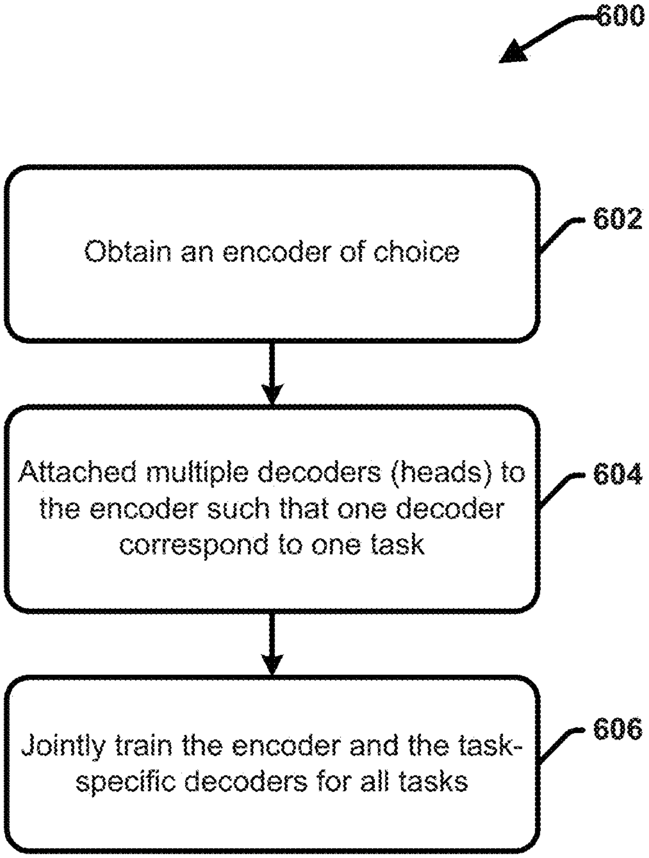
FIG. 6 presents a flow diagram of an example process for generating a common backbone encoder in accordance with one or more embodiments.
Figure 7:
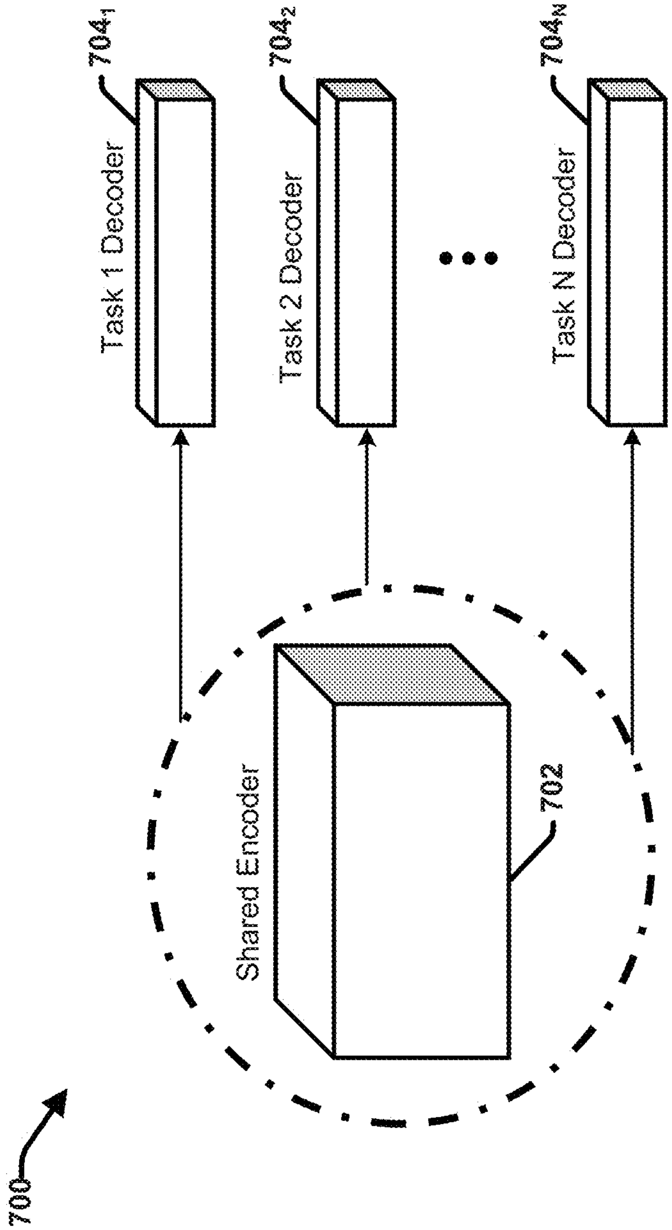
FIG. 7 illustrates an example neural network model architecture comprising a common encoder and a plurality of task specific decoders in accordance with one or more embodiments.

In this regard, FIG. 6 FIG. 6 presents a flow diagram of an example process for generating a common backbone encoder in accordance with one or more embodiments. At 602, the training component 106 can obtain an encoder of choice (e.g., as stored in the model repository 110) or another network accessible machine learning model database. The encoder can include any suitable DNN type encoder, including but not limited to a, a ResNet encoder, an attention-Unet encoder, or the like. The obtained encoder corresponds to a previously trained version of the encoder network without established weights tailored to a particular task. At 604, the training component can attach multiple decoders (also referred to as heads) to the encoder such that one decoder correspond to one task of the plurality of different tasks that the multi-task neural network will be trained to perform, as illustrated in FIG. 7. In this regard, FIG. 7 illustrates an example neural network model architecture comprising a shared encoder 702 and a plurality of task specific decoders $\mathbf{704}_{1-N}$, in accordance with one or more embodiments.

With reference to FIGS. 6 and 7, the respective decoders $\mathbf{704}_{1-N}$, may correspond to any suitable DNN type decoder and have same or similar architectures. In this regard, as described above with respect to autoencoder DNN, both the shared encoder 702 and the task-specific decoders $\mathbf{704}_{1-N}$ respectively comprise a DNN architecture consisting of a plurality of interconnected layers with one or more nodes respectively included in each convolutional layer. The initial decoders also correspond to previously trained versions of decoders without established weights tailored to their particular decoding tasks. The training component 106 may obtain the respective pre-trained decoder models as included in the model repository 110 or another network accessible machine learning model database.

At 606, the training component can jointly train the shared encoder and the task-specific decoders $\mathbf{704}_{1\text{-}N}$ to perform all of the respective tasks that the task-specific decoders are desired to perform. For example, in some embodiments, the respective tasks may correspond to segmenting different anatomical ROIs depicted in input medical image data. With these embodiments, the shared encoder 702 can function as a common feature extractor that reduces the input medical image into a feature vector representation and the task-specific decoders can respectively be jointly trained (e.g., using self-supervised learning on unlabeled task training data, using supervised learning, or combinations thereof) to segment a different anatomical ROI based on the same feature vector output by the encoder network. During training, the training component 106 can ensure the training dataset comprises an equal distribution of training samples for each task. For example, as applied to segmenting different ROIs, the training component 106 can ensure the training data (e.g., extracted from training data 130) comprises equal distributions of medical images depicting each of the different ROIs to be segmented by the respective decoders. Once training has been completed, the shared encoder 702 and the respective task specific decoders task-specific decoders $\mathbf{704}_{1\text{-}N}$ will have tuned weights and parameters that are tailored to perform their respective inference outputs, that is a common feature extraction output by the shared encoder 702 based on the input data, and different decoded interpretation of the common feature extraction output generated by the respective. task-specific decoders $\mathbf{704}_{1\text{-}N}$.

With reference again to FIG. 5 and process 500, after a trained/tuned backbone encoder has been obtained (e.g., in accordance with processes 600 or as previously generated and provided in the model repository 110), at 504, the task defining component 104 creates the one or more task-specific channels for the multi-task neural network model to be generated in accordance with the disclosed task crystallization techniques. In this regard, similar to process 200 and step 204, for each task-specific channel, the task defining component 104 defines initial task-specific elements for respective layers of the backbone encoder. For example, for a given task-specific channel, the task defining component 104 defines and adds one or more task-specific elements to each layer of the backbone encoder. As described above, the task-specific elements can include task-specific nodes, the specific logic performed by each task-specific node (e.g., acting as a filter, a function or another type of neural network element), and the task-specific weights respectively associated with each task-specific node. In various embodiments, the task-specific nodes added to respective layers of the backbone encoder at 504 for each task-specific channel correspond to filters. Similar to process 200, in some embodiments, the task-defining component 104 can restrict the number of task-specific nodes added to respective layers of the backbone encoder for each task such that the amount added is proportional to (e.g., less than or equal to) the amount of existing backbone nodes included in each layer of the backbone encoder.

In addition to adding task-specific elements to respective layers of the backbone encoder for each task-specific channel, at 504, the task-defining component 104 also defines and adds the task-specific decoders to the backbone encoder for each task-specific channel. In some embodiments, the task-specific decoders added here can correspond to the previously trained and tuned task specific decoders $\mathbf{704}_{1\text{-}N}$ generated in accordance with process 600. In other embodiments, the task-specific decoders added at 504 can correspond to new, pre-trained versions of decoders. In this regard, each task-specific channel generated in accordance with process 500 includes an encoder portion and a task-specific decoder. The encoder portion includes the backbone encoder and the task-specific elements added to respective layers of the backbone encoder.

At 506, the training component 104 tunes the parameters of each task-specific channel through training based on defined optimization criteria. In this regard, the training component 104 can separately tune the task-specific elements of each channel respectively associated with the encoder and the task-specific decoder, which can include adding and/or removing task-specific nodes (e.g., filters or other types of neural network elements) to/from respective layers of the backbone encoder and/or the task-specific decoder and adjusting weights associated with one or of the task-specific nodes associated with the encoder portion and/or the task-specific decoder. Of particular importance, in association with training each task-specific channel, the training component 106 does not adjust or change any of the parameters or elements (e.g., nodes and/or node weights) of the backbone encoder. Said differently, the training component 106 maintains the original parameters of the common encoder model while adjusting only the task-specific parameters or elements associated with the tasks-specific channels.

The training process performed at 506 can follow conventional machine learning model training regimens including supervised machine learning, unsupervised machine learning and/or combinations thereof, depending on the particular type of inferencing task that the respective task-specific channels are being trained to perform. In this regard, in association with training a task-specific channel, the training component 106 trains the task-specific channel to generate a desired inference output based on a task-specific training dataset (e.g., included in the training data 130) that the task-specific channel is adapted to processes. The training component 106 further independently trains and tunes the elements of each task-specific channel until the optimization criteria have been satisfied and convergence has been reached. The training of each task-specific channel may be performed in sequence or in parallel. In this regard, steps 504 and 506 of process 500 can be repeated any number or times to add any number of desired task-specific channels have been added.

The optimization criteria can correspond to the same or similar optimization criteria described with reference to process 200. For example, the optimization criteria can include one or more minimum performance metrics for the task-specific channel that account for a level of accuracy, quality and/or specificity of the channel's inferencing capability. For example, in various implementations, the optimization criteria can include a minimum Dice score for the task-specific channel. The optimization criteria utilized by the training component 106 can further include one or more defined resource optimization objectives, including minimizing the inferencing latency or speed and the memory resource consumption of the task-specific channel while also meeting a defined performance accuracy level (e.g., a minimum Dice score or another performance valuation metric).

Figure 8:
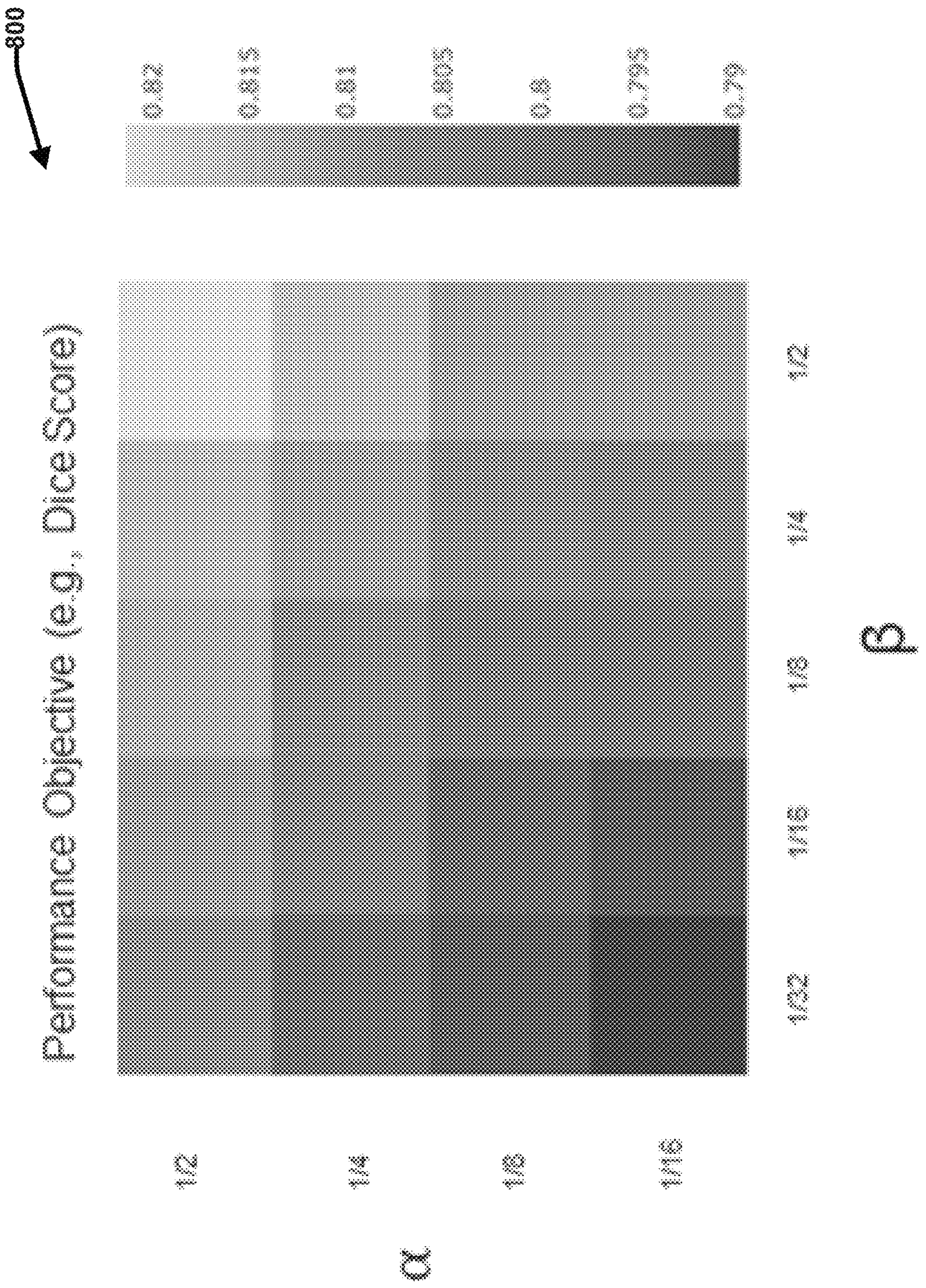
FIG. 8 presents an example chart illustrating the impact of different task-specific encoder and decoder filter combinations on model performance for a given task-specific channel of a multi-task neural network model in accordance with one or more embodiments of the disclosed subject matter.

For example, FIG. 8 presents an example chart 800 illustrating the impact of different task-specific encoder and decoder filter combinations on model performance (e.g., measured as a function of a Dice score or Dice value) for a given task-specific channel of a multi-task neural network model in accordance with one or more embodiments of the disclosed subject matter. The parameter α is used here to denote the total number of task-specific encoder filters (e.g., nodes) added to the common encoder for a given task-specific channel and the parameter β is used do denote the total number of decoder filters included in the task-specific decoder for the given task-specific channel. The values of both α and β (e.g., ½, ¼, ⅛, 1/16, etc.) are based on the corresponding existing amount (e.g., pre-training/tuning) of filters in the shared encoder and the initial task-specific decoder, respectively. In this regard, a value α=½ means that the total number of task-specific filters added to the shared encoder (accounting for all the layers) is half of the amount of backbone filters included in the backbone encoder (e.g., with a minimum of 1 task filter per layer to preserve information flow).

As indicated in chart 800, as the Dice score increases as the values for α and β are increased. However, increasing these values also increases the resource constraints imposed by the task-specific channel in terms of memory resource utilization and overall processing latency or speed. With reference to FIGS. 5 and 8, in this regard, the process of training and tuning the task-specific parameters at 506 can involve finding the optimal combination of α and β for a given task-specific channel that achieves a minimum performance score (e.g., a minimum Dice score), yet also minimizes the memory resource requirements and inferencing speed of the task-specific channel.

For example, in accordance with process 500 and steps 504 and 506 which can be performed iteratively, for a given α and β pair, the task-defining component 104 can add the task-specific encoder filters to the backbone encoder and the task-specific encoder filter weights using α, and create a task-specific decoder using β. The training component 106 then trains the task-specific encoder task weights and task decoder together on the specific dataset. The training component can further determine and record the best overall Dice score obtained for the task-specific channel and the particular α and β pair after training. The task defining component 104 and the training component 106 can repeat this process for any number of different pairs of α and β. In the end, the training component 106 will have set of performance values for the task-specific channel for different α & β pairs corresponding to chart 800. The training component 106 can further pick one specific α and β pair (and associated filter weights) to set or crystalize for the task-specific channel based on its performance score satisfying the performance criterion (e.g., a minimum Dice score) and that best satisfy or achieve the resource optimization criteria regarding number of parameters/speed trade-off (e.g., the optimal α & β pair having the lowest total number of parameters that also meets the minimum performance objective/Dice score). This process is repeated for every task-specific channel until all tasks have found their operational sweet point (wherein easier tasks may allow for smaller α, β than more challenging tasks).

Figure 9:
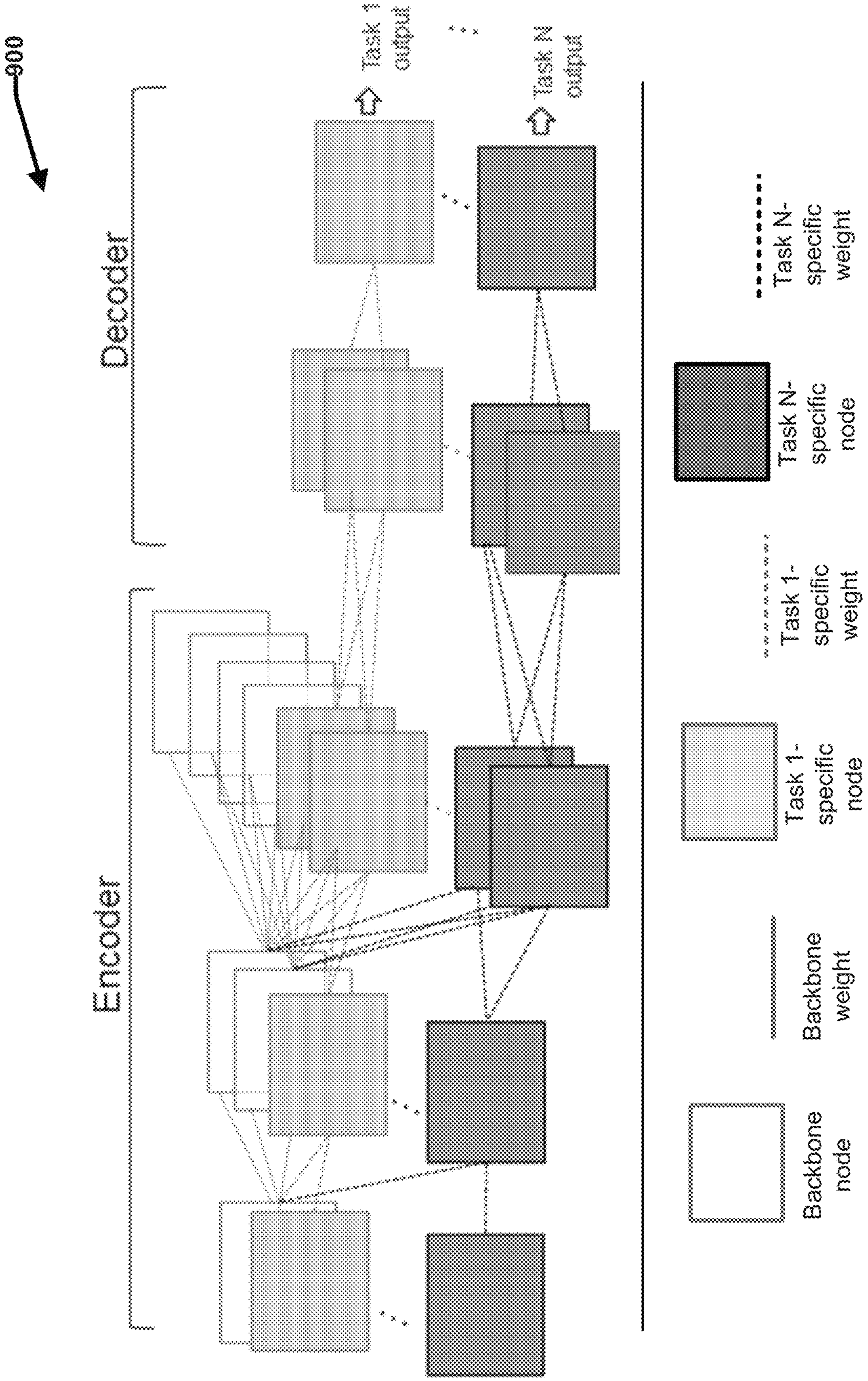
FIG. 9 illustrates another example multi-task neural network model with a task crystallization architecture generated in accordance with the disclosed task crystallization techniques in accordance with one or more embodiments.

Continuing with process 500, once all task-specific channels have been added and tuned to determine and set the optimal task-specific elements or parameters (e.g., α and β vales and corresponding filter weights) at 506, the assembly component 108 can assemble the backbone encoder and all tuned task-specific channels into a single, multi-task neural network model, as illustrated in FIG. 9.

In this regard, FIG. 9 illustrates another example multi-task neural network model 900 with a task crystallization architecture generated in accordance with the disclosed task crystallization techniques in accordance with one or more embodiments. Multi-task neural network model 900 is similar to multi-task neural network model 400 yet tailored to an encoder-decoder DNN architecture. In this regard, multi-task neural network 900 comprises both an encoder portion and a decoder portion. The encoder portion corresponds to multi-task neural network 400 and the decoder portion includes only the task-specific decoders. In accordance with this embodiment, the backbone encoder does not produce a final output and is only re-used as a shared feature extractor for the task-specific channels.

In this regard, the assembly component 106 combines the backbone encoder and the task-specific (crystallized) encoder filters for respective layers of the backbone encoder and each of the different tasks together into a single graph structure. The assembly component 106 assembles the decoders in a similar manner, resulting in single decoder producing multi-task outputs along different output channels. In some embodiments, the decoders may or may not be configured to receive information from the shared backbone filters, per developer discretion.

Similar multi-task neural network model 400, the multi-task neural network model 900 has the following properties:

Parameter sharing: Every task-specific crystalized node (e.g., a filter or another type of neural network element) is connected to the previous layer's crystalized node or nodes that perform the same task, as well as to all backbone nodes of the previous layer. As a result, the crystalized nodes/filter can learn to make efficient usage of the backbone node outputs adapt them for a particular task at every layer of the network.

Task independence: Crystalized task-specific nodes of one task do not connect to crystalized, task-specific nodes of other tasks nor serve as inputs to the shared backbone. As a result, the task specific nodes of each task-specific channel are independent of one another such that the result of one task-specific channel will not affect another's. This property allows each task-specific channel to be separately trained and maintained and updated without affecting other ones of the task specific channels.

Partial Inferencing: Due to the independence of the task-specific channels throughout the network, the single graph structure of the multi-task neural network model 900 can be cleanly partitioned (from beginning to end) into sub-graphs or sub-models comprising one or more task-specific channels such that a partial inferencing of any subset of tasks can be achieved to further save inferencing time without incurring redundant operations or requiring conditional flow on graphs. In this regard, task crystallization organizes every tasks filters throughout the network in a static way, such that every task can be pre-partitioned and only the required sub-graph can be loaded to the utilized to run/execute the sub-graph to reduce resource consumption.

With reference to FIGS. 1-9, the model development component 102 can further store the trained multi-task neural network models (e.g., model 900 or the like) generated by the model development component 102 in accordance with process 500 in model repository 110 for usage in runtime applications by the model application component 114. In this regard, the model application component 114 can include inferencing component 116 to apply one or more of the task-specific channels of a multi-task neural network model generated using task crystallization to corresponding input data for the respective channels (e.g., included in runtime data 132) to generate the corresponding inference outputs. In some embodiments, the inferencing component 116 may execute the entirety of a multi-task neural network model (e.g., model 900 or the like) to generate all of the different tasks specific inference outputs that the model is capable of generating (e.g., the backbone task output and the respective task outputs 1-N). Additionally, or alternatively, the selection component 118 and the partitioning component 120 can facilitate partial inferencing in association with selectively executing a subset of the inferencing tasks (e.g., wherein the subset may include one or more task, two or more tasks, three of more tasks, and so on).

The disclosed task crystallization techniques further facilitate model updating and improvements by the training component 106 without requiring retraining of the shared backbone model (e.g., which can include only the shared encoder in some embodiments, as described with reference to FIGS. 5-9). In this regard, suppose a conventional, multi-task jointly trained DLL model having an encoder-decoder architecture illustrated in FIG. 7 was trained to perform an inferencing task on medical images (e.g., segmentation, diagnosis/classification, or another inferencing task) later needs to enhance its performance for a given task, such as new types of medical images from new mobile devices with new data domain and distributions. If decoder improvements alone cannot provide enough of a performance gain, then the developer will be forced to re-train the entire shared encoder, requiring new regulatory filings for every task. In contrast, task crystallization gives the flexibility to enhance both the task-specific encoder and task-specific decoder portions of the shared model for a particular task without requiring re-certification of any other tasks, as the other tasks and the shared backbone portion are not changed when a single task-specific channel is tuned and updated. This allows task crystallization to have a much lower long-term expected upkeep cost.

Figure 10:
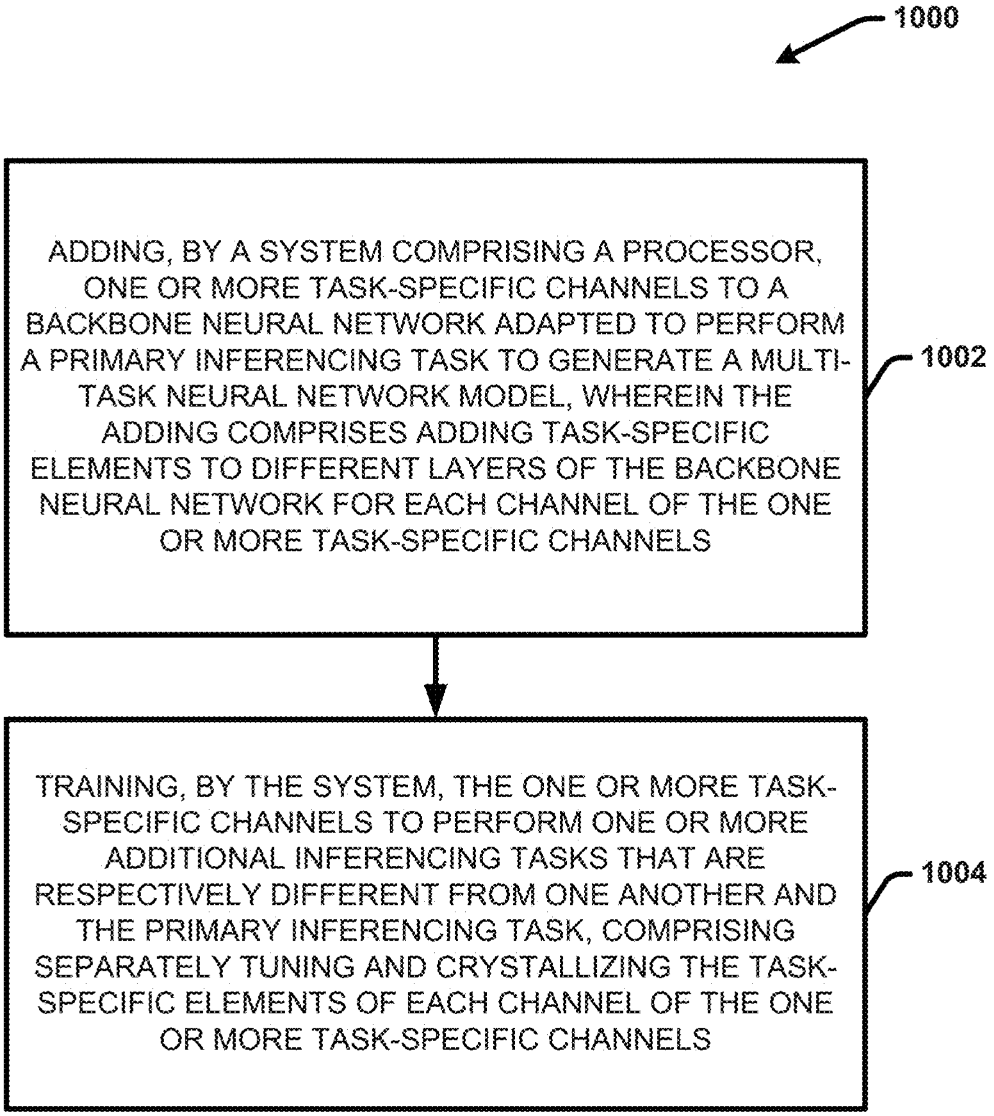
FIG. 10 illustrates a block diagram of an example, non-limiting computer implemented method for generating a multi-task neural network model using task crystallization in accordance with one or more embodiments of the disclosed subject matter.

FIG. 10 illustrates a block diagram of an example, non-limiting computer implemented method 1000 for generating a multi-task neural network model using task crystallization in accordance with one or more embodiments of the disclosed subject matter. At 1002, method 1000 comprises adding, by a system comprising a processor (e.g., system 100 using task defining component 104), one or more task-specific channels to a backbone neural network adapted to perform a primary inferencing task to generate a multi-task neural network model, wherein the adding comprises adding task-specific elements (e.g., one or more task-specific nodes, one- or more task-specific filters, one or more task-specific filter weights, and/or other types of neural network elements) to different layers of the backbone neural network for each channel of the one or more task-specific channels. At 1004, method 1000 further comprises training, by the system (e.g., using training component 106), the one or more task-specific channels to perform one or more additional inferencing tasks that are respectively different from one another and the primary inferencing task, comprising separately tuning and crystallizing the task-specific elements of each channel of the one or more task-specific channels. In various embodiments, the training process comprises separately tuning and crystallizing the task specific elements in association with achieving a defined performance criterion for the one or more additional inferencing tasks and optimizing one or more additional resource objectives of the multi-task neural network model. For example, the separately tuning can include adding and/or removing task-specific nodes and/or filters, changing task-specific filter weights, and adjusting other task-specific elements or parameters and associated values associated with the respective task-specific channels.

Figure 11:
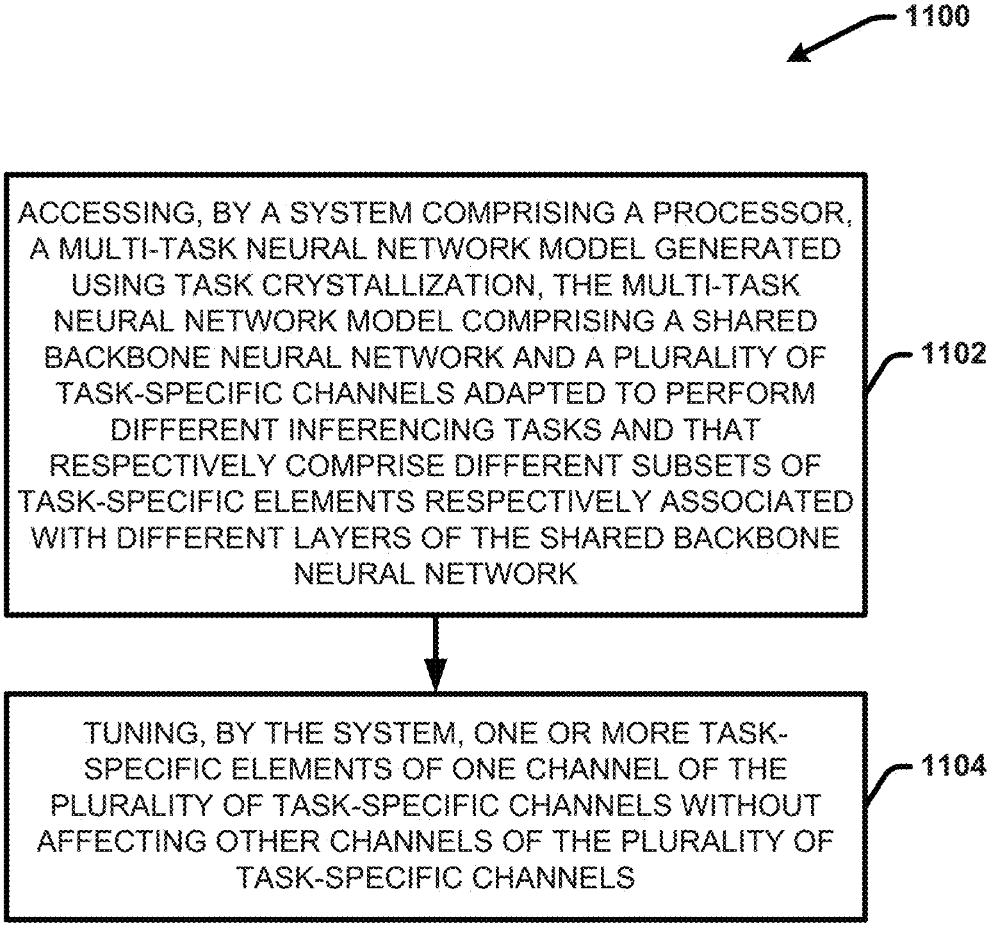
FIG. 11 illustrates a block diagram of an example, non-limiting computer implemented method for independently tuning respective task-specific channels of a multi-task neural network model generated using task crystallization in accordance with one or more embodiments of the disclosed subject matter.

FIG. 11 illustrates a block diagram of an example, non-limiting computer implemented method 1100 for independently tuning respective task-specific channels of a multi-task neural network model generated using task crystallization in accordance with one or more embodiments of the disclosed subject matter. In various embodiments, method 900 can be performed by the training component 106 to independently train and/or retrain or update one or more task-specific channels of a multi-task neural network model generated using task crystallization.

At 1102, method 1100 comprises accessing, by a system comprising a processor (e.g., system 100 or the like), a multi-task neural network model (e.g., included in model repository 110) generated using task crystallization, the multi-task neural network model comprising a shared backbone neural network and a plurality of task-specific channels adapted to perform different inferencing tasks and that respectively comprise different subsets of task-specific elements (e.g., filters or the like) respectively associated with different layers of the shared backbone neural network. At 904, method 900 further comprises tuning, by the system (e.g., via training component 106), one or more task-specific elements of one channel of the plurality of task-specific channels without affecting other channels of the plurality of task-specific channels. For example, the tuning may comprise adding one or more task-specific filters to one or more layers of the shared backbone neural network, removing one or more of the task-specific filters, adjusting filter weights and/or adjusting other task-specific parameters of the channel.

Figure 12:
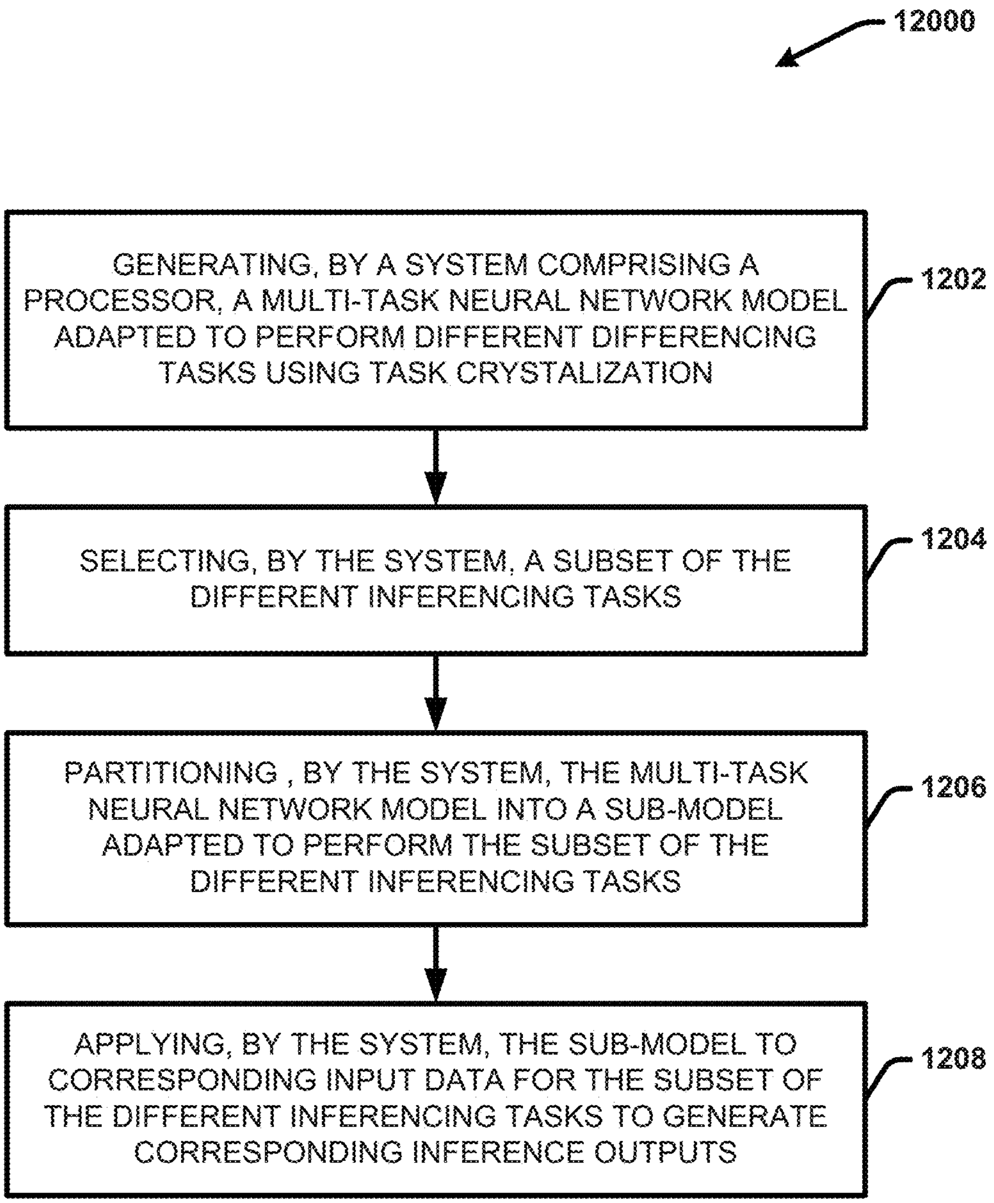
FIG. 12 illustrates a block diagram of an example, non-limiting computer implemented method for selectively partitioning a multi-task neural network model generated using task crystallization in accordance with one or more embodiments of the disclosed subject matter.

FIG. 12 illustrates a block diagram of an example, non-limiting computer implemented method 1200 for selectively partitioning a multi-task neural network model generated using task crystallization in accordance with one or more embodiments of the disclosed subject matter.

At 1202, method 1200 comprises generating, by a system comprising a processor (e.g., system 100 or the like via model development module 102), a multi-task neural network model using task crystallization. At 1204, method 1200 further comprises selecting, by the system (e.g., via selection component 118) a subset of the different inferencing tasks. For example, the selection component may automatically select a subset of the inferencing tasks that are applicable to a particular runtime workflow or input dataset. In another example, the selection component may receive manual input selecting the particular inferencing tasks to be applied to a particular input dataset. At 1206, method 1200 further comprises partitioning, by the system (e.g., via partitioning component 120) the multi-task neural network model into a sub-model adapted to perform the subset of the different inferencing tasks. At 1208, method 1200 further comprises applying, by the system (e.g., via inferencing component 116), the sub-model to corresponding input data for the subset of the different inferencing tasks and to generate corresponding inference outputs. For example, in some embodiments, the partitioning component 120 can identify the specific channel or channels of the multi-task neural network model that correspond to the selected inferencing task or tasks and the inferencing component 116 can selectively execute only those corresponding channels of the multi-task neural network model.

Experiments

This section describes experiments testing task crystallization in comparison with various alternative multi-task neural network methods as applied to a multi-organ segmentation task. The multi-organ segmentation task evaluated included segmenting different anatomical regions of interest (ROIs) in brain magnetic resonance imaging (MRI)

images. Seven different ROI segmentation tasks were evaluated, including the anterior commissure-posterior commissure (APCP) line, the optic nerve (ON), the hippocampus (HIP), the internal auditory canal (IAC), the pituitary gland (PIT), the mid sagittal plane-axial (MSPA) and the mid sagittal plane-coronal (MSPC).

The disclosed task crystallization techniques were used to train and develop a multi-organ segmentation model (hereinafter the task crystallization (TC) model) with seven different task specific channels, one for each ROI. The alternative methods to which the TC model performance was compared comprised of individual model training (i.e., training and developing completely separate encoder-decoder models for each ROI), conventional joint model training (as described in the Background section), and a previous method developed by the inventors of the subject task crystallization techniques and described in U.S. patent application Ser. No. 18/046,347, entitled "DEEP LEARNING IMAGE ANALYSIS WITH INCREASED MODULARITY AND REDUCED FOOTPRINT." filed on Nov. 17, 2022, (hereinafter referred to as "previous method").

The previous method uses a dedicated encoder and decoder for each task. The final encoder outputs from a task-specific encoder and a shared encoder are combined before sending them to a decoder. Unlike TC, the previous method has no mechanism for feature sharing at the micro-layer level. This could require the dedicated encoder to learn redundant features with the shared backbone, resulting in inefficient usage of parameters and thus larger resource requirements than TC for the same performance. In the previous method, the encoder design involves multiple disjoint models (each dedicated encoder is an isolated graph). TC, on the other hand, uses one single graph after assembly. A continuous graph is more efficient in hardware utilization due to consolidated memory addressing. As a result, TC has faster inferencing speed for the same performance, as verified by the experimental results discussed below.

In addition, the previous method has a relatively more complicated training scheme for the common backbone, as it requires a student-teacher training paradigm for each task to create the shared backbone and task-specific backbone. TC on the other hand does not require such complexity. In this regard, a shared backbone can be trained using process 600 or the like, and task-specific filters can be trained from scratch and independently for each task-specific channel. As a result, TC requires significantly less training time and development efforts than the previous method.

In accordance with the experimental comparison, a TC model was generated in accordance with process 500 to generate a TC model corresponding to multi-task neural network model 900. In this regard, a common encoder network and seven task-specific decoders, one for each ROI, were initially obtained/created. A task-specific channel was created for each ROI segmentation task, consisting of its task-specific encoder portion and its task-specific decoder, wherein the task-specific encoder portion included one or more task-specific filters added to each layer of the common encoder network, the task-specific filters receiving one way information flow from preceding layer backbone encoder filters to which they are connected. Each task-specific channel was further separately trained to segment a particular ROI of the seven different ROIs. The training consisted of parameter tuning including tuning (e.g., adding and/or removing) the task-specific encoder filters and the corresponding decoder filters (i.e., tuning parameters $\alpha$, $\beta$), and tuning the task-specific encoder and decoder filter weights. Task performance of each channel was evaluated under different channel parameters for $\alpha$ and $\beta$ using a Dice score assessment, as described with reference to chart 800. Both the TC model and the previous method model explored the same sets of parameters for the respective ROI segmentation tasks.

FIG. 13 presents a table (Table 1300) comparing the respective methods in terms of multi-task performance, providing the best Dice score obtained for each ROI task for the compared techniques, including individual model training, joint training, previous method and task crystallization. As evidenced by comparison of the Dice scores for each ROI task for each of the respective methods, task crystallization was able to outperform individual training results while using a multi-task architecture, whereas the previous method struggles to match all of the individual training results, (those tasks most deficient in comparison highlighted in grey). Further, the joint training model produced poorer results than the individual trained models due to task interference, as described in the Background section.

It is important to note that the model parameters that resulted in the best Dice scores presented in Table 1300 may not be the optimal operational parameter for inferencing purposes (due to speed or resource concerns). In this regard, in addition to comparing the respective methods based on model performance, the experimental evaluation was also concerned with evaluating whether the TC model could perform as good or better as the previous method while further achieving a reduction in inferencing speed or (inferencing latency) and a reduction in resource consumption (e.g., memory resources and computational resources). Therefore, additional experimental steps were taken to find the "best" operational parameters for each ROI task in association with comparing TC with the previous method (as individually trained models are naturally attributed to significantly more resource utilization relative to multi-task architecture models such as TC and the previous method).

In this regard, since increasing $\alpha$ and $\beta$ leads to more resource consumption and slower inferencing speed, the operational parameters for each ROI task for the TC model and the previous method model were selected using the following two criteria: (1)—the task performance must meet a pre-defined performance objective, which in this experiment was a Dice score of greater than or equal to 0.82, and (2)—given 1, choose the parameters that have the minimal model memory footprint. As applied to the previous method's multi-task model, for each task, the previous method model used the individual ROI task training Dice as its performance target to select its optimal operating parameters with the lowest footprint. When it cannot meet this performance objective regardless of operating point, then instead uses whatever the best target is that it can achieve. For the TC model, for each task, the operating parameters were selected based on the performance target set by the previous method.

After selecting operational parameters for both the previous method model and the TC model, both models are ensured to be created equally accurate and have ensured corresponding architectures from both methods are optimal for inferencing purposes. Thereafter, both models were evaluated and benchmarked with respect to their resource consumption and inferencing speed. Both models were also compared to the individually trained ROI models in terms of resource consumption and inferencing speed. The results are presented in Tables 14 and 15, of FIGS. 14 and 15 respectively, and graphs 16 and 17 of FIGS. 16 and 17, respectively.

In this regard, FIG. 14 presents a table (Table 14) indicating the cumulative measured inferencing speed (in milliseconds, (ms)) of the respective seven ROI segmentation tasks for the individual models, the previous method and the TC model. The value included in each cell of the last row for the last task (e.g., corresponding to task MSPC) indicates the total or cumulative inferencing time for all seven tasks. TC has the lowest cumulative inferencing time for all tasks relative to the previous method and the individually trained models.

FIG. 15 presents a table (Table 15) indicating the total number of parameters (e.g., nodes or filters) associated with the respective individual models, the previous method model and the TC model for as a function of the different tasks. Again, the value included in each cell of the last row for the last task (e.g., corresponding to task MSPC) indicates the total or cumulative number of parameters for all seven tasks. TC has the lowest cumulative number of parameters all tasks relative to the previous method and the individually trained models (e.g., and thus requires a lower amount of memory for storage and a lower amount of computational resources for execution).

Figure 16:
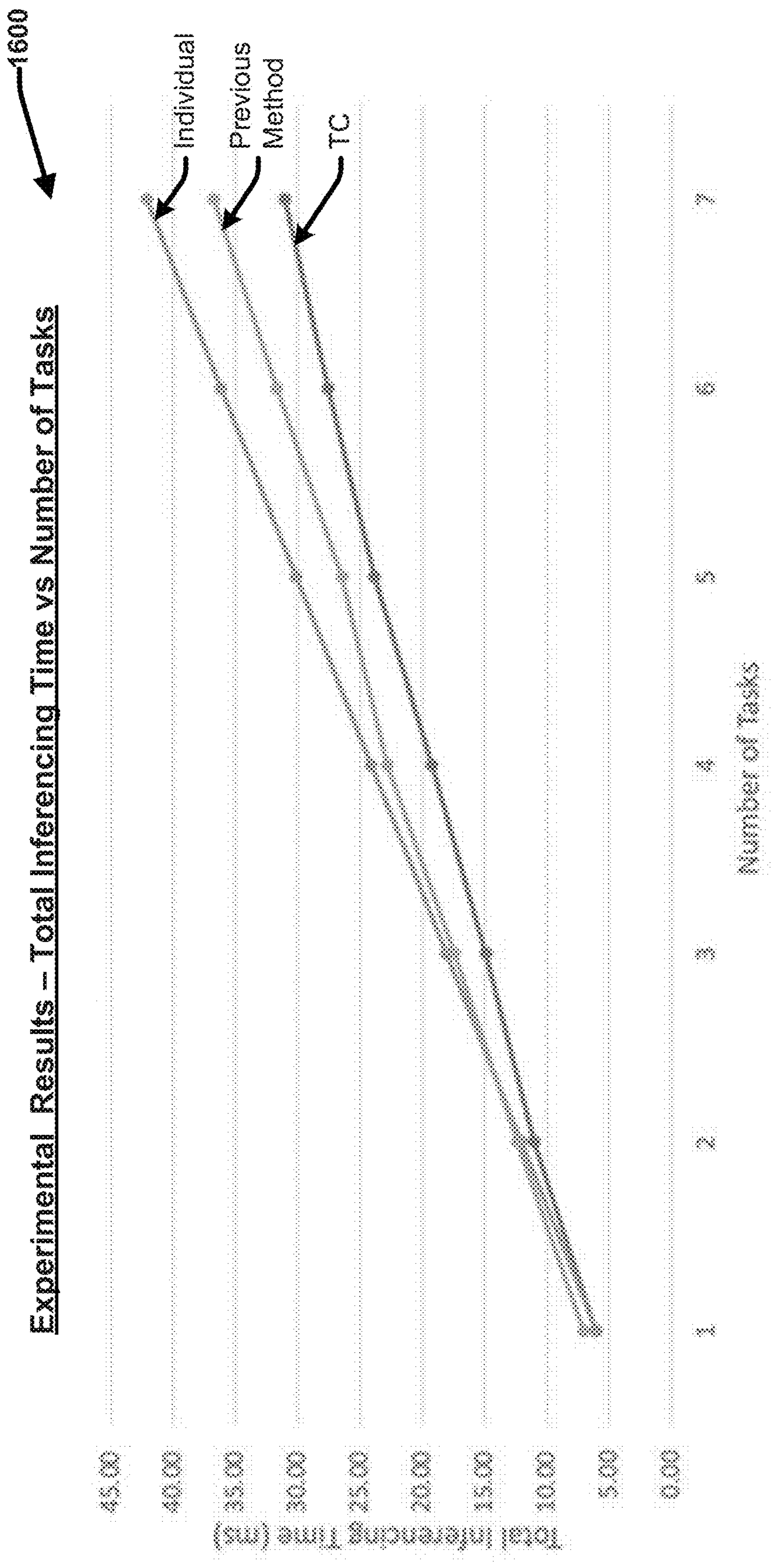
FIGS. 16 and 17 present graphs providing the results of an experiment testing task crystallization in comparison to alternative methods as applied to generate AI models adapted to perform multiple organ segmentation tasks.

FIG. 16 presents a graph (Graph 1600) plotting the change in inferencing speed of the individual models, the previous model and the TC model as a function of number of tasks. As illustrated in Graph 1600, the TC model outperforms the individual models and the previous methods on every number of the different tasks in terms of inferencing speed.

Figure 17:
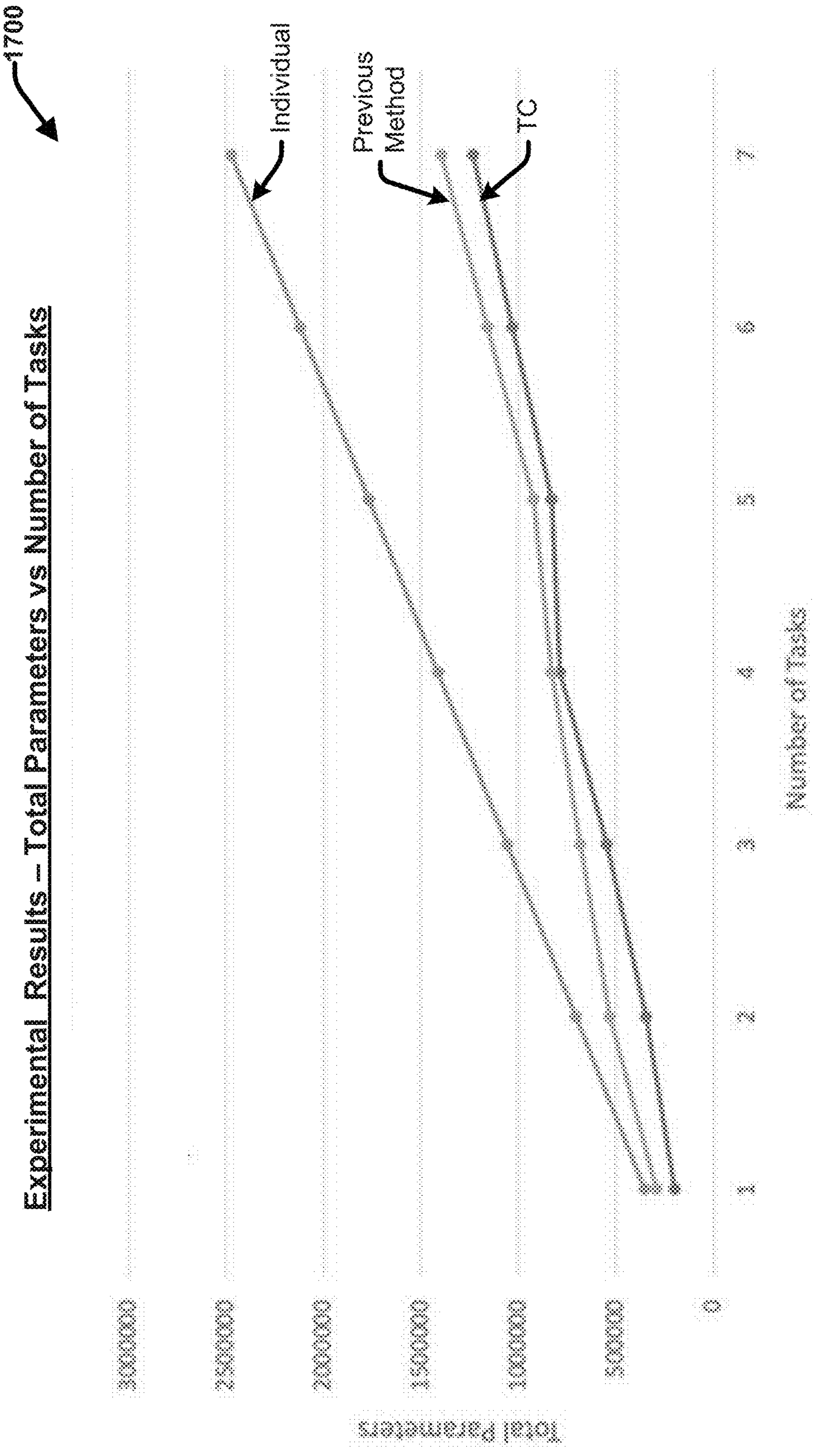

FIG. 17 presents a graph (Graph 1700) plotting the change in total number of model parameters as a function of number of tasks for the individual models, the previous method model and the TC model. As illustrated in Graph 1700, the TC model significantly outperforms the individual models as well as the previous methods on every number of the different tasks in terms of total number of parameters.

Example Operating Environments

One or more embodiments of the disclosed subject matter can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. For example, one or more inferencing models (e.g., multi-task inferencing models, sub-models, or components thereof) may be written in a suitable machine-learning programming language and executed via one or more GPUs, CPUs or combinations thereof. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 18, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 18:
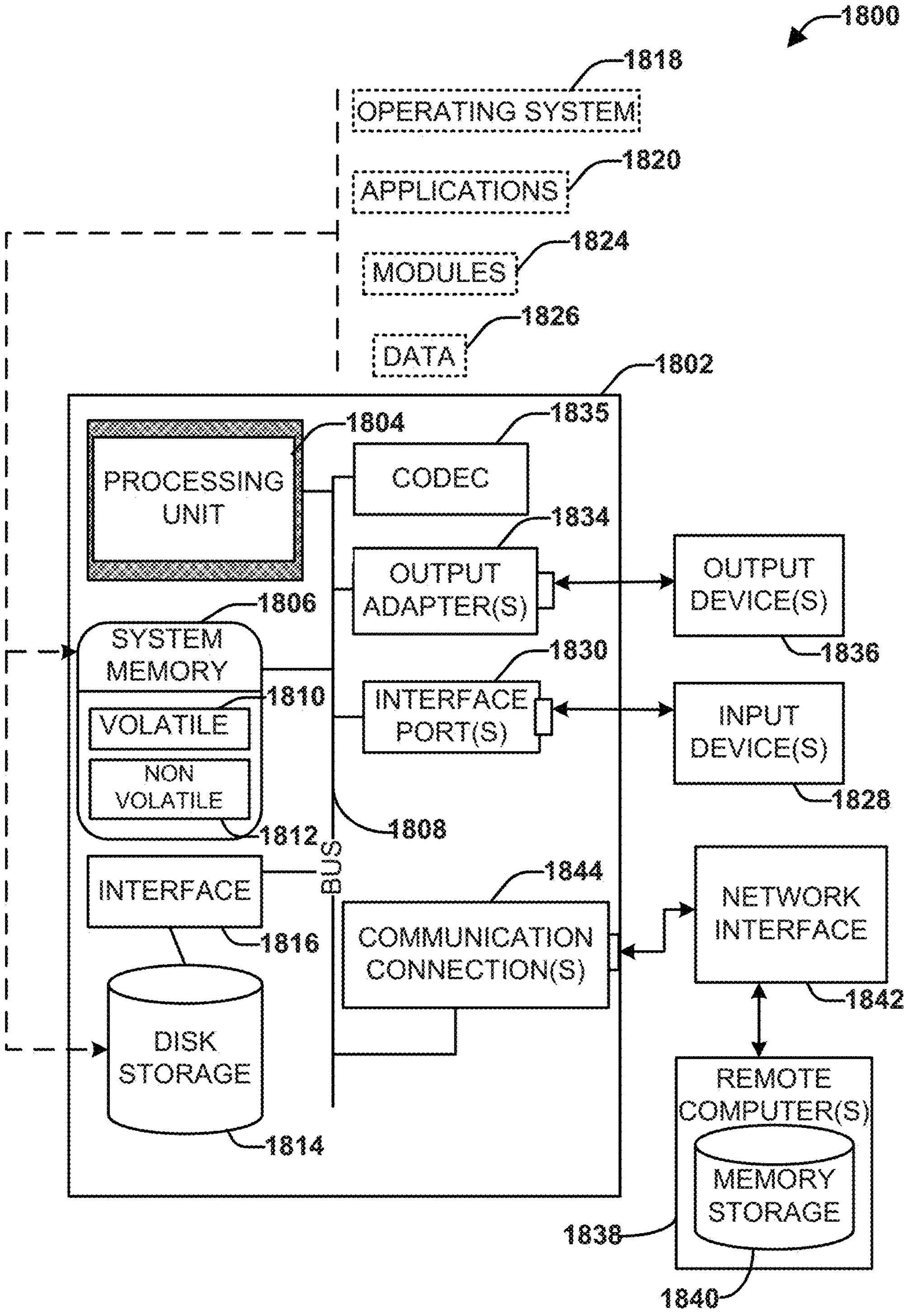
FIG. 18 illustrates a block diagram of an example, non-limiting operating environment in which one or more embodiments described herein can be facilitated.

With reference to FIG. 18, an example environment 1800 for implementing various aspects of the claimed subject matter includes a computer 1802. The computer 1802 includes a processing unit 1804, a system memory 1806, a codec 1835, and a system bus 1808. The system bus 1808 couples system components including, but not limited to, the system memory 1806 to the processing unit 1804. The processing unit 1804 can be any of various available processors. Dual microprocessors and other multiprocessor architectures also can be employed as the processing unit 1804.

The system bus 1808 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13184), and Small Computer Systems Interface (SCSI).

The system memory 1806 includes volatile memory 1810 and non-volatile memory 1812, which can employ one or more of the disclosed memory architectures, in various embodiments. The basic input/output system (BIOS), containing the basic routines to transfer information between elements within the computer 1802, such as during start-up, is stored in non-volatile memory 1812. In addition, according to present innovations, codec 1835 can include at least one of an encoder or decoder, wherein the at least one of an encoder or decoder can consist of hardware, software, or a combination of hardware and software. Although, codec 1835 is depicted as a separate component, codec 1835 can be contained within non-volatile memory 1812. By way of illustration, and not limitation, non-volatile memory 1812 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1812 can employ one or more of the disclosed memory devices, in at least some embodiments. Moreover, non-volatile memory 1812 can be computer memory (e.g., physically integrated with computer 1802 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1810 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1802 can also include removable/non-removable, volatile/non-volatile computer storage medium. FIG. 18 illustrates, for example, disk storage 1814. Disk storage 1814 includes, but is not limited to, devices like a magnetic disk drive, solid state disk (SSD), flash memory card, or memory stick. In addition, disk storage 1814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1814 to the system bus 1808, a removable or non-removable interface is typically used, such as interface 1816. It is appreciated that disk storage 1814 can store information related to an entity. Such information might be stored at or provided to a server or to an application running on an entity device. In one embodiment, the entity can be notified (e.g., by way of output device(s) 1836) of the types of information that are stored to disk storage 1814 or transmitted to the server or application. The entity can be provided the opportunity to opt-in or opt-out of having such information collected or shared with the server or application (e.g., by way of input from input device(s) 1828).

It is to be appreciated that FIG. 18 describes software that acts as an intermediary between entities and the basic computer resources described in the suitable operating environment 1800. Such software includes an operating system 1818. Operating system 1818, which can be stored on disk storage 1814, acts to control and allocate resources of the computer system 1802. Applications 1820 take advantage of the management of resources by operating system 1818 through program modules 1824, and program data 1826, such as the boot/shutdown transaction table and the like, stored either in system memory 1806 or on disk storage 1814. It is to be appreciated that the claimed subject matter can be implemented with various operating systems or combinations of operating systems.

An entity enters commands or information into the computer 1802 through input device(s) 1828. Input devices 1828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1804 through the system bus 1808 via interface port(s) 1830. Interface port(s) 1830 include, for example, a serial port, a parallel port, a game port, and a universal serial bus (USB). Output device(s) 1836 use some of the same type of ports as input device(s) 1828. Thus, for example, a USB port can be used to provide input to computer 1802 and to output information from computer 1802 to an output device 1836. Output adapter 1834 is provided to illustrate that there are some output devices 1836 like monitors, speakers, and printers, among other output devices 1836, which require special adapters. The output adapters 1834 include, by way of illustration and not limitation, video and sound cards that provide a means of connection between the output device 1836 and the system bus 1808. It should be noted that other devices or systems of devices provide both input and output capabilities such as remote computer(s) 1838.

Computer 1802 can operate in a networked environment using logical connections to one or more remote computers, such as remote computer(s) 1838. The remote computer(s) 1838 can be a personal computer, a server, a router, a network PC, a workstation, a microprocessor based appliance, a peer device, a smart phone, a tablet, or other network node, and typically includes many of the elements described relative to computer 1802. For purposes of brevity, only a memory storage device 1840 is illustrated with remote computer(s) 1838. Remote computer(s) 1838 is logically connected to computer 1802 through a network interface 1842 and then connected via communication connection(s) 1844. Network interface 1842 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1844 refers to the hardware/software employed to connect the network interface 1842 to the bus 1808. While communication connection 1844 is shown for illustrative clarity inside computer 1802, it can also be external to computer 1802. The hardware/software necessary for connection to the network interface 1842 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 19:
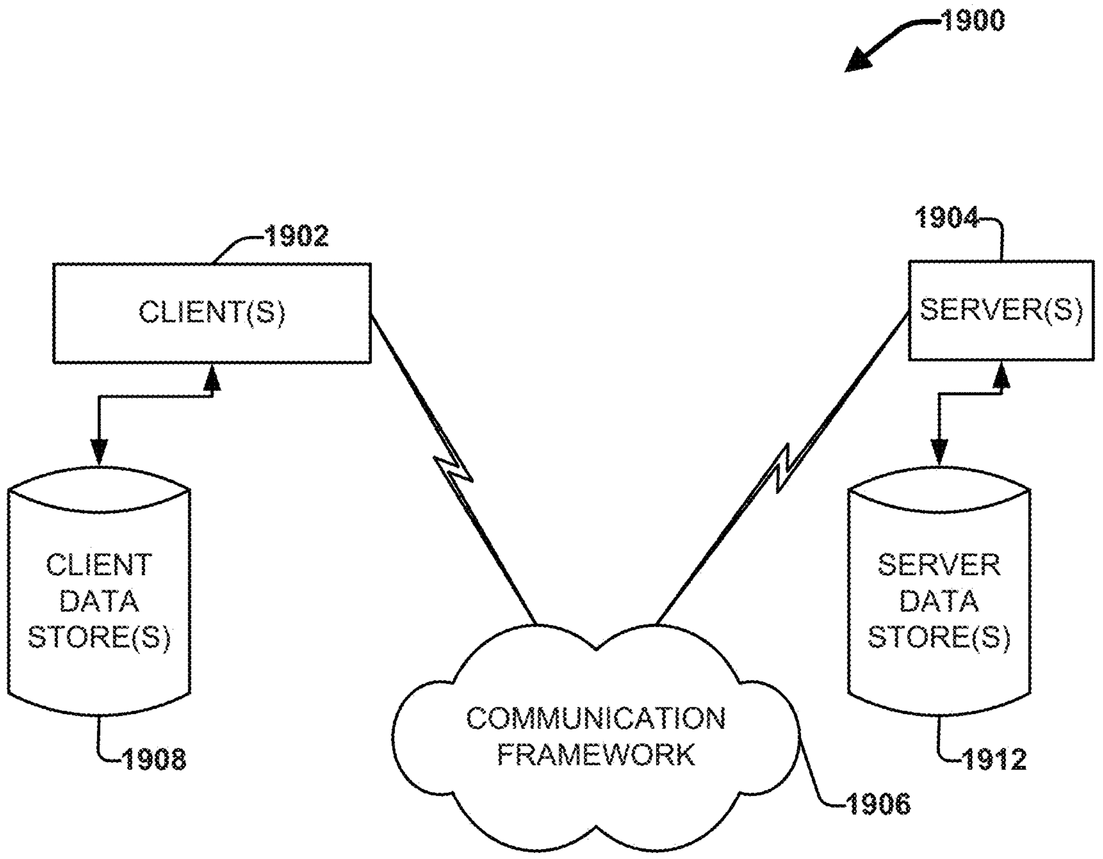
FIG. 19 illustrates a block diagram of another example, non-limiting operating environment in which one or more embodiments described herein can be facilitated.

Referring to FIG. 19, there is illustrated a schematic block diagram of a computing environment 1900 in accordance with this disclosure in which the subject system (e.g., system 100 and the like), methods and computer readable media can be deployed. The computing environment 1900 includes one or more client(s) 1902 (e.g., laptops, smart phones, PDAs, media players, computers, portable electronic devices, tablets, and the like). The client(s) 1902 can be hardware and/or software (e.g., threads, processes, computing devices). The computing environment 1900 also includes one or more server(s) 1904. The server(s) 1904 can also be hardware or hardware in combination with software (e.g., threads, processes, computing devices). The servers 1904 can house threads to perform transformations by employing aspects of this disclosure, for example. In various embodiments, one or more components, devices, systems, or subsystems of system 100 can be deployed as hardware and/or software at a client 1902 and/or as hardware and/or software deployed at a server 1904. One possible communication between a client 1902 and a server 1904 can be in the form of a data packet transmitted between two or more computer processes wherein the data packet may include healthcare related data, training data, AI models (e.g., multi-task neural network models, sub-models and/or components thereof), input data for the AI models, encrypted output data generated by the AI models, and the like. The data packet can include a metadata, e.g., associated contextual information, for example. The computing environment 1900 includes a communication framework 1906 (e.g., a global communication network such as the Internet, or mobile network(s)) that can be employed to facilitate communications between the client(s) 1902 and the server(s) 1904.

Communications can be facilitated via a wired (including optical fiber) and/or wireless technology. The client(s) 1902 include or are operatively connected to one or more client data store(s) 1908 that can be employed to store information local to the client(s) 1902. Similarly, the server(s) 1904 are operatively include or are operatively connected to one or more server data store(s) 1912 that can be employed to store information local to the servers 1904.

In one embodiment, a client 1902 can transfer an encoded file, in accordance with the disclosed subject matter, to server 1904. Server 1904 can store the file, decode the file, or transmit the file to another client 1902. It is to be appreciated, that a client 1902 can also transfer uncompressed file to a server 1904 can compress the file in accordance with the disclosed subject matter. Likewise, server 1904 can encode video information and transmit the information via communication framework 1906 to one or more clients 1902.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor; and a memory that stores executable instructions, that when executed by the processor, facilitate performance of operations comprising:

generating a multi-task neural network model comprising a plurality of task-specific channels respectively configured to perform different inferencing tasks, wherein the multi-task neural network model comprises a backbone neural network comprising a plurality of layers, and wherein the generating comprises, for each channel of the task-specific channels:

adding channel-specific elements associated with a corresponding inferencing task to respective layers of the backbone neural network, connecting the channel-specific elements to backbone elements of at least some of the respective layers, and isolating the channel-specific elements from other channel-specific elements associated with other channels of the task-specific channels;

training each channel of the task-specific channels independently to perform the different inferencing tasks, wherein the training comprises determining values of the channel-specific elements to be added to the respective layers based on a defined performance criterion associated with the corresponding inference task and one or more resource optimization objectives for the multi-task neural network model and freezing the channel-specific elements at the determined values; and selecting a subset of the different inferencing tasks;

identifying a subset of the task-specific channels that correspond to the selected subset of different inferencing tasks; and executing the subset of the task-specific channels to generate one or more corresponding inference results.

2. The system of claim 1, wherein the one or more resource optimization objectives comprise at least one of, minimizing an overall memory footprint of the multi-task neural network model or minimizing an overall latency of the multi-task neural network model.

3. The system of claim 1, wherein the generating further comprises:

training first channel-specific elements associated with a first channel independently of second channel-specific elements associated with a second channel.

4. The system of claim 1, wherein the generating further comprises, for each channel:

training the channel specific elements while maintaining the backbone elements of the backbone neural network unchanged.

5. The system of claim 1, wherein the channel-specific elements comprise task-specific filters, and wherein the backbone elements comprise backbone filters of the backbone neural network.

6. The system of claim 5, wherein the channel-specific filters receive one-way information flow from any of the backbone filters to which they are connected.

7. The system of claim 1, wherein the backbone neural network comprises an encoder network, a decoder network, or a combined encoder and decoder network.

8. The system of claim 1, wherein the executing comprises executing the subset of the task-specific channels independently of one or more other task-specific channels of the multi-task neural network model.

9. The system of claim 8, wherein the operations further comprise, prior to the executing, partitioning the multi-task neural network model into a task-specific sub-model corresponding to the subset of the different inferencing tasks associated with the subset of the task-specific channels.

10. The system of claim 9, wherein the task-specific sub-model comprises fewer channel-specific elements than the multi-task neural network model and excludes other channel-specific elements associated with a different inferencing task.

11. A method, comprising:

generating, by a system comprising a processor, a multi-task neural network model comprising a plurality of task-specific channels respectively configured to perform different inferencing tasks, wherein the multi-task neural network model comprise a backbone neural network comprising a plurality of layers, and wherein the generating comprises, for each channel of the task-specific channels:

adding channel-specific elements associated with a corresponding inferencing task to respective layers of the backbone neural network, connecting the channel-specific elements to backbone elements of at least some of the respective layers, and isolating the channel-specific elements from other channel-specific elements associated with other channels of the task-specific channels;

training each channel of the task-specific channels independently to perform the different inferencing tasks, wherein the training comprises determining values of the channel-specific elements to be added to the respective layers based on a defined performance criterion associated with the corresponding inference task and one or more resource optimization objectives for the multi-task neural network model and freezing the channel-specific elements at the determined values; and selecting a subset of the different inferencing tasks;

identifying a subset of the task-specific channels that correspond to the selected subset of different inferencing tasks; and executing, by the system, the subset of the task-specific channels to generate one or more corresponding inference results.

12. The method of claim 11, wherein the one or more resource optimization objectives comprise at least one of, minimizing an overall memory footprint of the multi-task neural network model or minimizing an overall latency of the multi-task neural network model.

13. The method of claim 11, wherein the generating further comprises:

training first channel-specific elements associated with a first channel independently of second channel-specific elements associated with a second channel.

14. The method of claim 11, wherein the channel-specific elements comprise task-specific filters, wherein the backbone elements comprises backbone filters wherein the channel-specific filters receive one-way information flow from any of the backbone filters to which they are connected.

15. The method of claim 11, wherein the generating further comprises, for each channel:

training the channel specific elements while maintaining the backbone elements of the backbone neural network unchanged.

16. A non-transitory machine-readable storage medium, comprising executable instructions that, when executed by a processor, facilitate performance of operations, comprising:

generating a multi-task neural network model comprising a plurality of task-specific channels respectively configured to perform different inferencing tasks, wherein the multi-task neural network model comprises a backbone neural network comprising a plurality of layers, and wherein the generating comprises, for each channel of the task-specific channels:

adding channel-specific elements associated with a corresponding inferencing task to respective layers of the backbone neural network, connecting the channel-specific elements to backbone elements of at least some of the respective layers, and isolating the channel-specific elements from other channel-specific elements associated with other channels of the task-specific channels;

training each channel of the task-specific channels independently to perform the different inferencing tasks, wherein the training comprises determining values of the channel-specific elements to be added to the respective layers based on a defined performance criterion associated with the corresponding inference task and one or more resource optimization objectives for the multi-task neural network model and freezing the channel-specific elements at the determined values; and selecting a subset of the different inferencing tasks;

identifying a subset of the task-specific channels that correspond to the selected subset of different inferencing tasks; and executing the subset of the task-specific channels to generate one or more corresponding inference results.

17. The non-transitory machine-readable storage medium of claim 16, wherein the generating further comprises:

training first channel-specific elements associated with a first channel independently of second channel-specific elements associated with a second channel and while maintaining the backbone elements of the backbone neural network unchanged.

18. The non-transitory machine-readable storage medium of claim 16, wherein the executing comprises executing the subset of the task-specific channels independently of another task-specific channel of the multi-task neural network model.

19. The non-transitory machine-readable storage medium of claim 18, wherein the operations further comprise partitioning the multi-task neural network model into a task-specific sub-model corresponding to the subset of the different inferencing tasks associated with the subset of task-specific channels, wherein the task-specific sub-model comprises fewer channel-specific elements than the multi-task neural network model and excludes other channel-specific elements associated with a different inferencing task.

* * * * *